(12) United States Patent
Azechi et al.

(10) Patent No.: US 12,075,015 B2
(45) Date of Patent: Aug. 27, 2024

(54) PRINTING SYSTEM

(71) Applicant: BROTHER KOGYO KABUSHIKI KAISHA, Nagoya (JP)

(72) Inventors: Haruka Azechi, Nagoya (JP); Shunsuke Minamikawa, Nagoya (JP); Tetsuya Okuno, Nagoya (JP); Ayaka Hotta, Nagoya (JP); Yushi Deura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/325,251

(22) Filed: May 30, 2023

(65) Prior Publication Data

US 2023/0308588 A1 Sep. 28, 2023

Related U.S. Application Data

(63) Continuation of application No. PCT/JP2021/039987, filed on Oct. 29, 2021.

(30) Foreign Application Priority Data

Nov. 30, 2020 (JP) ................................ 2020-198909

(51) Int. Cl.
*H04N 1/34* (2006.01)
*H04N 1/00* (2006.01)

(52) U.S. Cl.
CPC ......... *H04N 1/344* (2013.01); *H04N 1/00225* (2013.01)

(58) Field of Classification Search
CPC .... G06F 3/1203; G06F 3/1224; G06F 3/1229; G06F 3/125; G06F 3/1254; G06F 3/1285;
(Continued)

(56) References Cited

U.S. PATENT DOCUMENTS

| 7,154,630 B1* | 12/2006 | Nimura | .............. H04N 1/00175 |
| | | | 358/1.18 |
| 11,882,256 B2* | 1/2024 | Deura | .................... H04N 1/342 |

(Continued)

FOREIGN PATENT DOCUMENTS

| JP | 2003263485 A | 9/2003 |
| JP | 2015201133 A | 11/2015 |

(Continued)

OTHER PUBLICATIONS

International Search Report dated Dec. 21, 2021 issued in PCT/JP2021/039987, 5 pages.

(Continued)

*Primary Examiner* — Negussie Worku
(74) *Attorney, Agent, or Firm* — Scully, Scott, Murphy & Presser, P.C.

(57) ABSTRACT

A printing system comprises a print engine and one or more controllers. The one or more controllers perform a data obtaining process of obtaining print data, a print controlling process of controlling the print engine to print an image based on a print setting value, a fee determining process of determining a fee to be charged when printing the image, and a setting value changing process of changing the print setting value.

14 Claims, 26 Drawing Sheets

(58) Field of Classification Search
CPC .... G06F 3/1289; G06F 13/102; G06F 3/1204; G06F 3/1207; G06F 3/1225; G06F 3/1231; G06F 3/1236; G06F 3/1259; G06F 3/1268; G06F 3/1272; G06F 3/1287; G06F 3/1288; G06F 3/129; G06F 3/1292; G06F 8/61; G06F 9/4411; G06F 9/542; G06F 3/12; G06Q 20/18; G06Q 20/123; G06Q 20/145; G06Q 30/0207; G06Q 30/0241; G06Q 10/087; G06Q 10/10; G06Q 20/127; G06Q 20/325; G06Q 20/3274; G06Q 20/3276; G06Q 30/0283; G06Q 30/04; H04N 2201/0094; H04N 1/32122; H04N 1/344; H04N 1/346; H04N 2201/3222; H04N 2201/3246; H04N 1/00244; H04N 1/00477; H04N 1/34; H04N 1/00225; G06K 19/06037; G06K 7/1417; G06K 15/4075; G07F 17/26; G07F 17/42; G07F 17/266; G07G 5/00; B41J 29/38; G03G 21/00
USPC ........................................................ 358/1.15
See application file for complete search history.

(56) References Cited

U.S. PATENT DOCUMENTS

| | | | | |
|---|---|---|---|---|
| 2004/0204986 | A1* | 10/2004 | Shimbori | G06Q 30/0273 705/14.69 |
| 2008/0123857 | A1* | 5/2008 | Okiyama | G06F 21/608 380/277 |
| 2013/0020402 | A1* | 1/2013 | Wallace | A47G 21/18 239/33 |
| 2014/0078522 | A1* | 3/2014 | Hiraki | G06Q 20/085 358/1.2 |
| 2014/0129399 | A1* | 5/2014 | Matsunaga | G07F 17/26 705/34 |
| 2015/0293727 | A1 | 10/2015 | Miyazawa et al. | |
| 2015/0331646 | A1 | 11/2015 | Taniguchi | |
| 2016/0222634 | A1* | 8/2016 | Chiolerio | E02F 9/2825 |
| 2018/0082097 | A1* | 3/2018 | Sun | H04N 1/346 |
| 2018/0213115 | A1 | 7/2018 | Sun et al. | |
| 2021/0090039 | A1* | 3/2021 | Yang | G06Q 20/28 |
| 2023/0020402 | A1* | 1/2023 | Minamikawa | B41J 29/42 |
| 2023/0308587 | A1* | 9/2023 | Azechi | G06F 3/1253 |

FOREIGN PATENT DOCUMENTS

| | | |
|---|---|---|
| JP | 2018043470 A | 3/2018 |
| JP | 2018118406 A | 8/2018 |
| JP | 2019014054 A | 1/2019 |
| WO | 2014091707 A1 | 6/2014 |

OTHER PUBLICATIONS

International Preliminary Report on Patentability and Written Opinion dated May 30, 2023 issued in PCT/JP2021/039987, together with English translation, 10 pages.

International Search Report dated Dec. 21, 2021 issued in PCT/JP2021/039987, 4 pages.

Notice of Reasons for Refusal dated Apr. 12, 2024 received in related Japanese Patent Application No. JP 2020-198909.

* cited by examiner

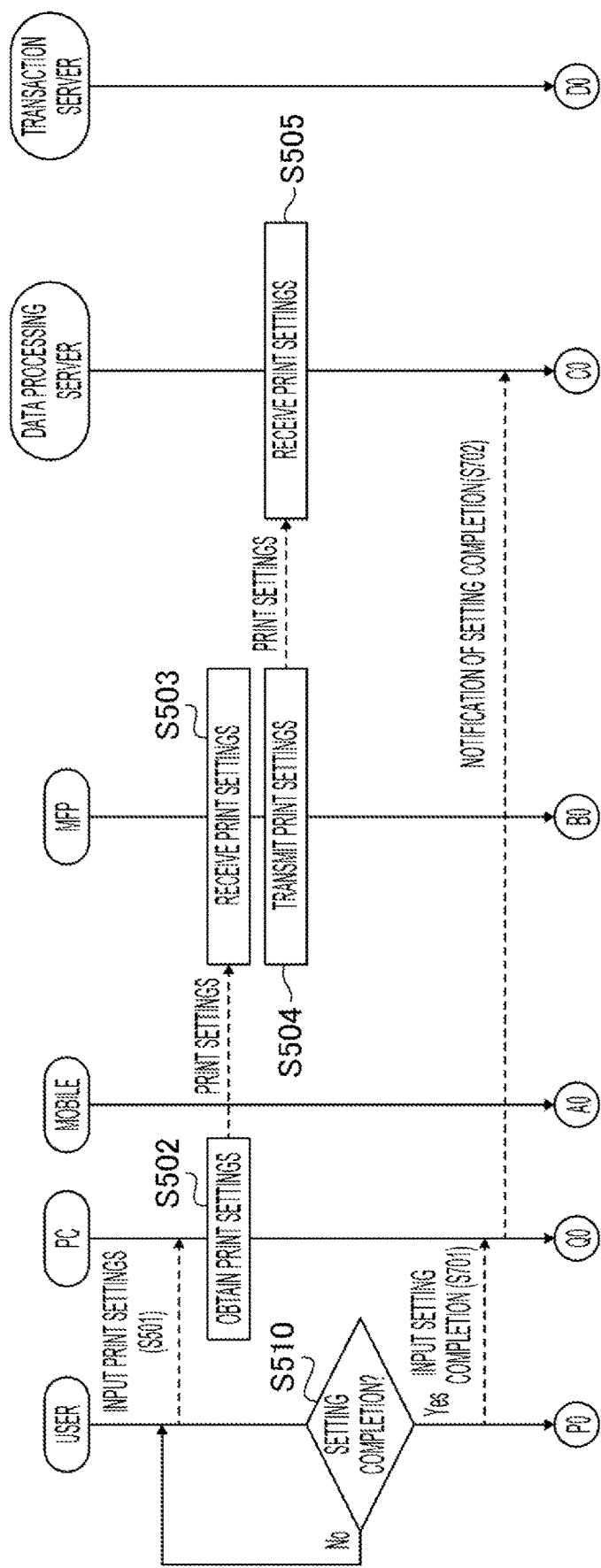

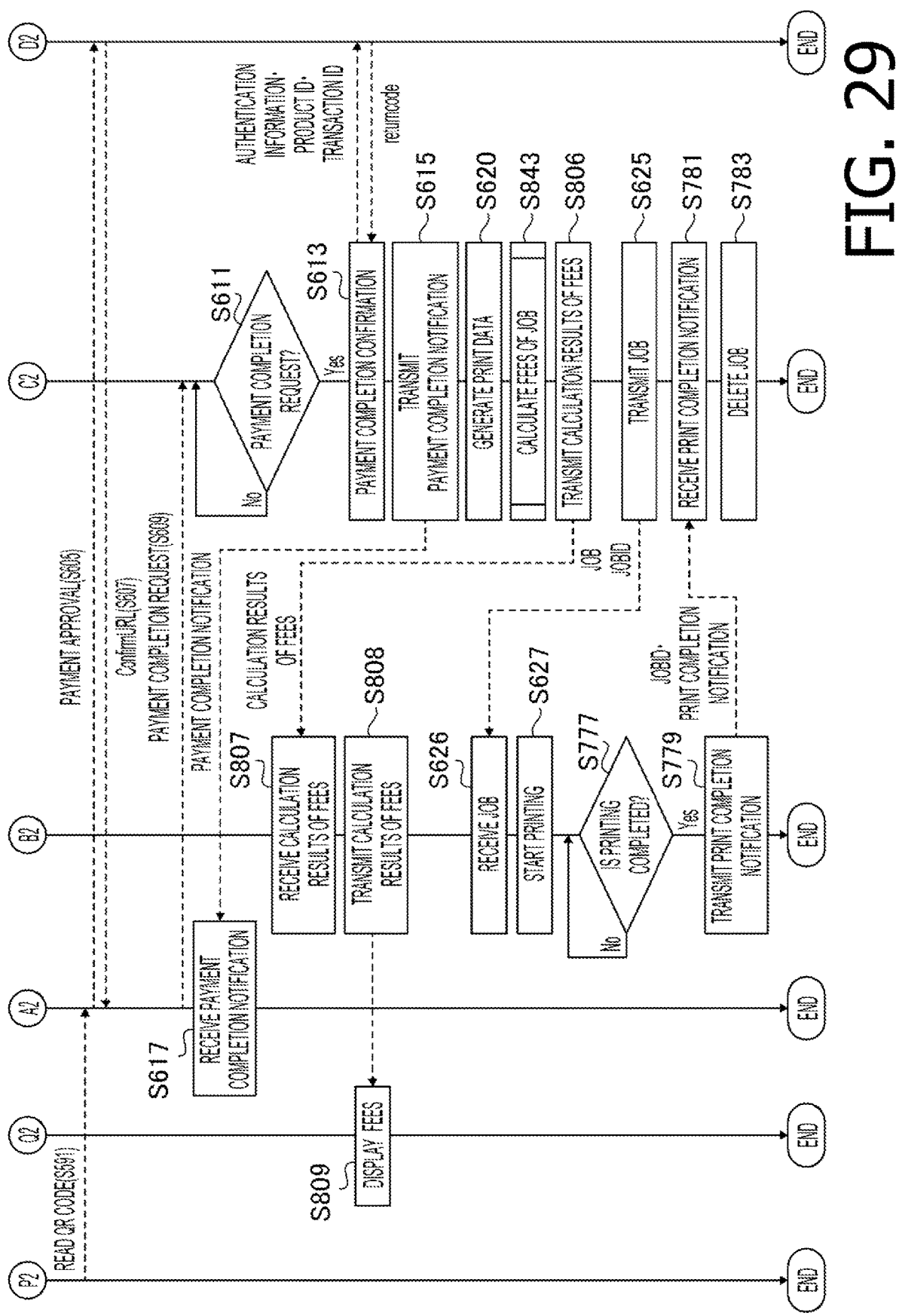

PRINTING SYSTEM

REFERENCE TO RELATED APPLICATIONS

This is a Continuation Application of International Application No. PCT/JP2021/039987 filed on Oct. 29, 2021, which claims priority from Japanese Patent Application No. 2020-198909 filed on Nov. 30, 2020. The entire disclosures of the prior applications are incorporated herein by reference.

BACKGROUND

The present disclosures relate to a printing system in which fees are charged according to printing of an image on a printing medium.

Conventionally, there are known printing services that charge users according to the content of the image to be printed and allow the images to be printed after the payment process for the charged fee has been completed through electronic payment.

DESCRIPTION

When using the printing service with electronic payment as described above, the print settings for printing images are usually determined in advance. However, there are cases in which the user wishes to change such pre-determined print settings as desired. There has been no conventional technology that takes such a point into consideration.

According to aspects of the present disclosures, there is provided a printing system including a print engine, and one or more controllers. The one or more controllers are configured to perform a data obtaining process of obtaining print data, a print controlling process of controlling the print engine to print an image corresponding to the print data on a printing medium based on a print setting value, a fee determining process of determining a fee to be charged when printing the image corresponding to the print data on the printing medium, and a setting value changing process of changing the print setting value.

Figure 8:
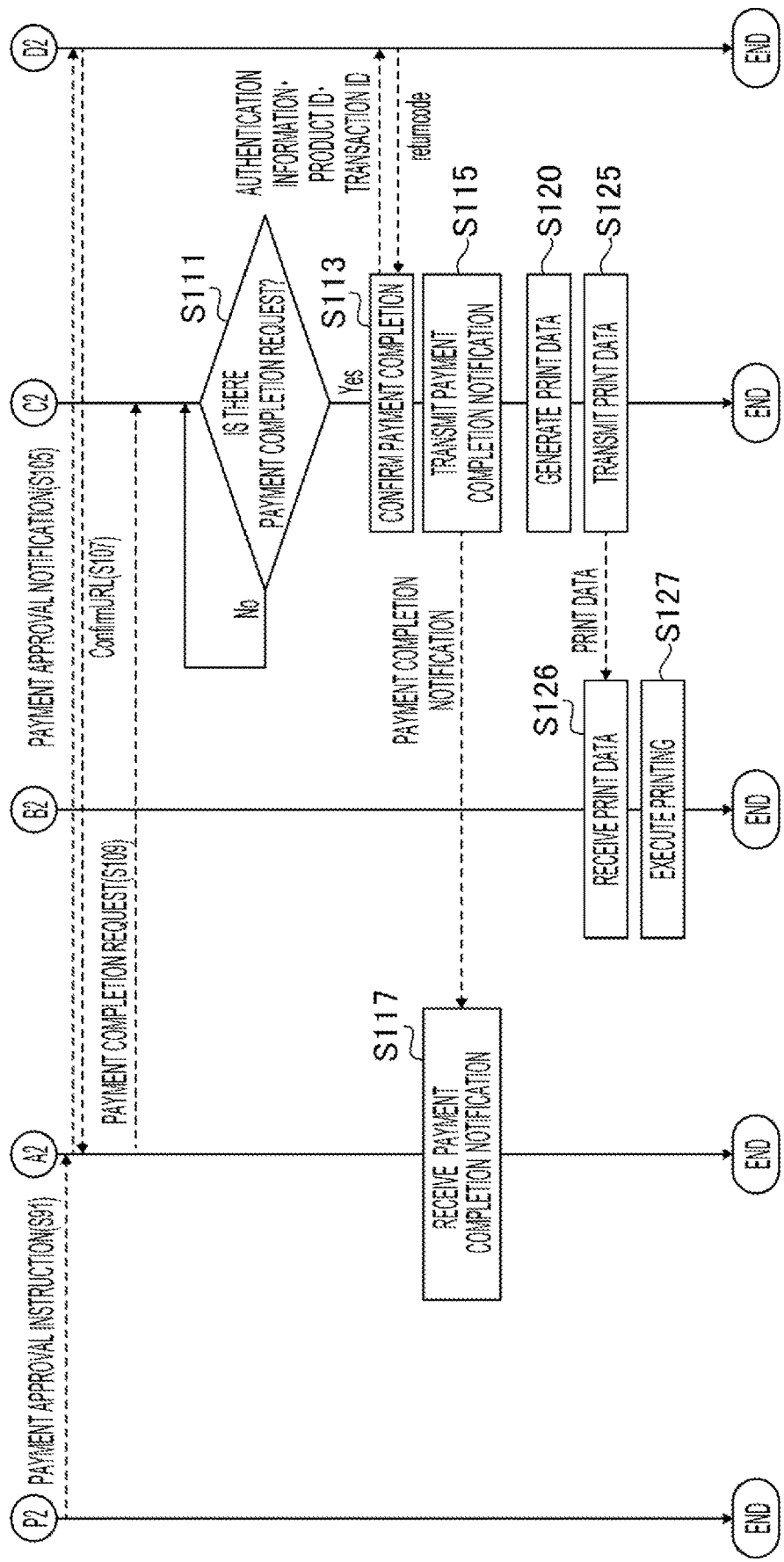

FIG. 8 a sequence chart illustrating processes performed by the mobile terminal, the MFP, the data processing server and the transaction server.

Figure 9A:
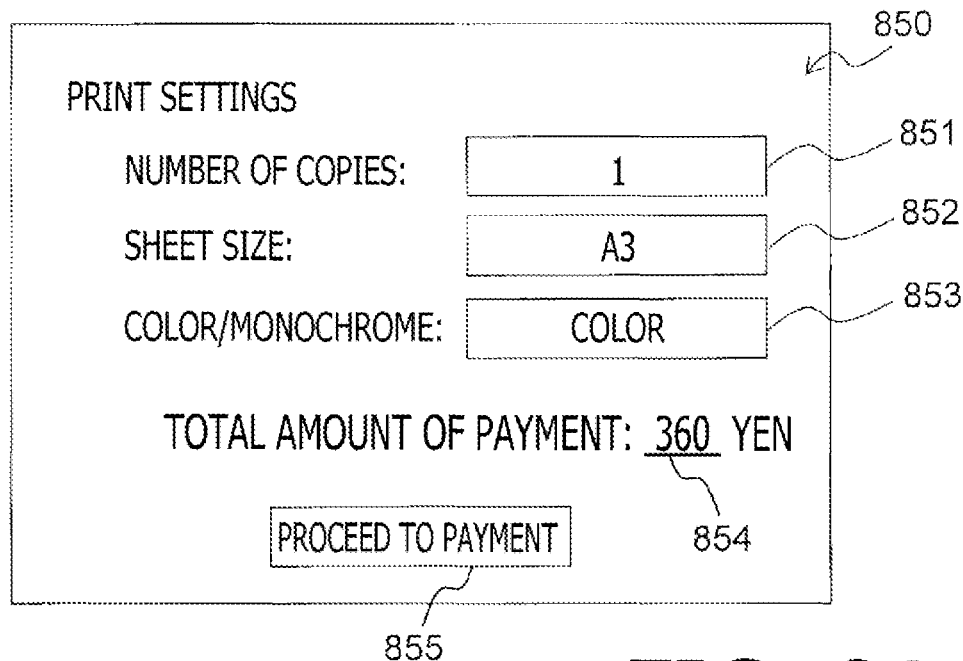
Figure 9B:
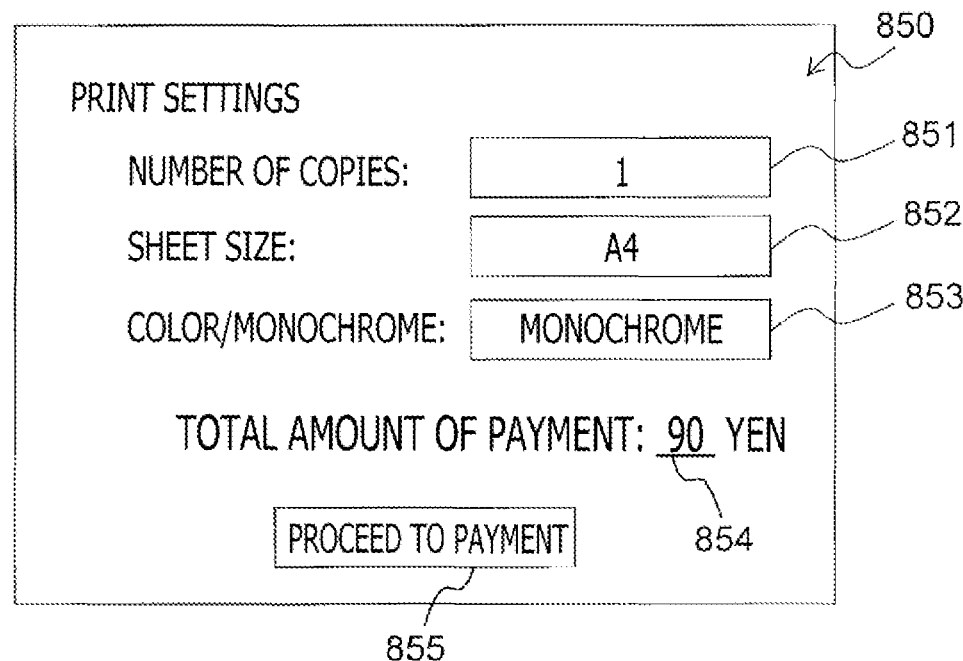

FIGS. 9A and 9B are examples of the setting change portal page displayed on the mobile terminal.

Figure 10:
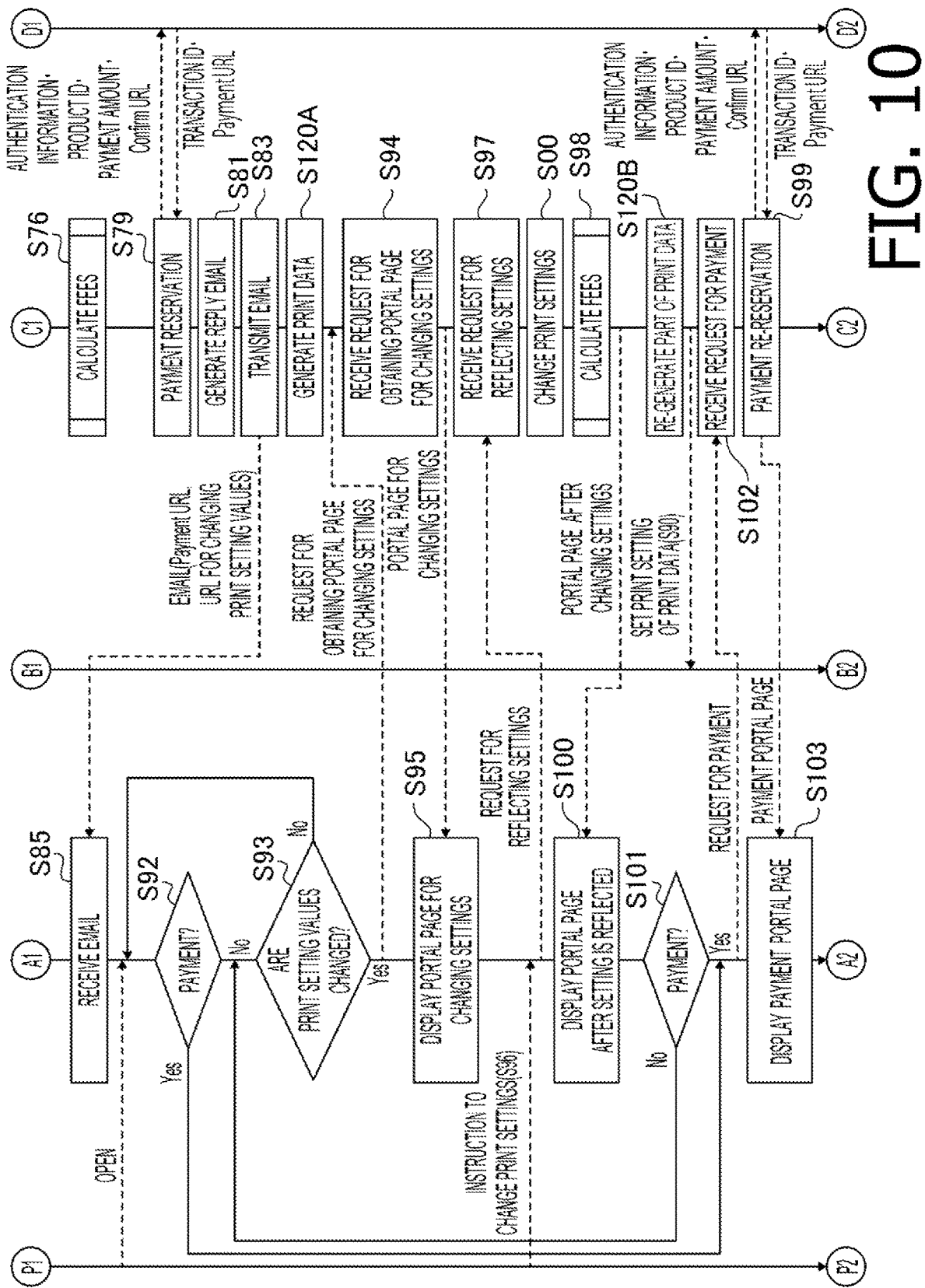

FIG. 10 is a sequence chart illustrating processes performed by the mobile terminal, the MFP, the data processing server and the transaction server according to a modification in which data generating timings are differentiated.

Figure 11A:
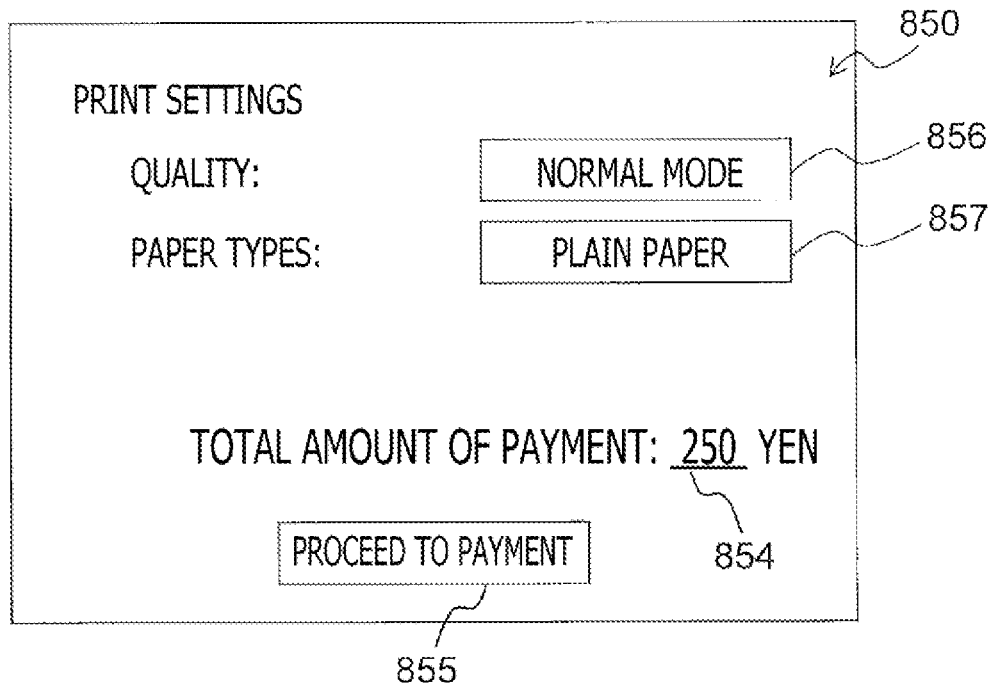
Figure 11B:
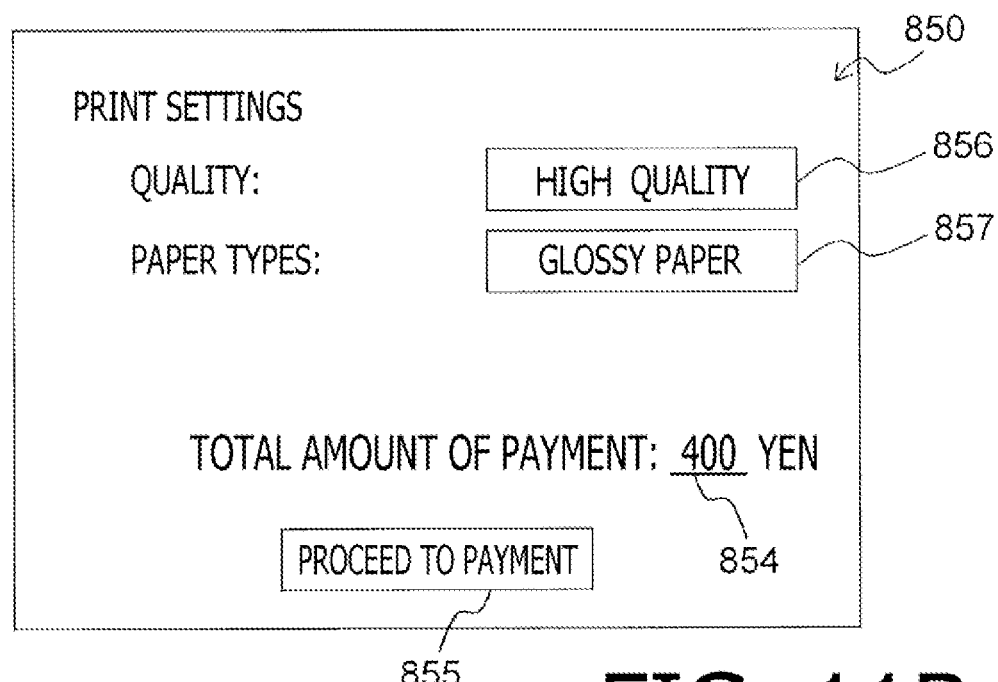

FIGS. 11A and 11B are examples of the setting change portal page displayed on the mobile terminal.

Figure 12:
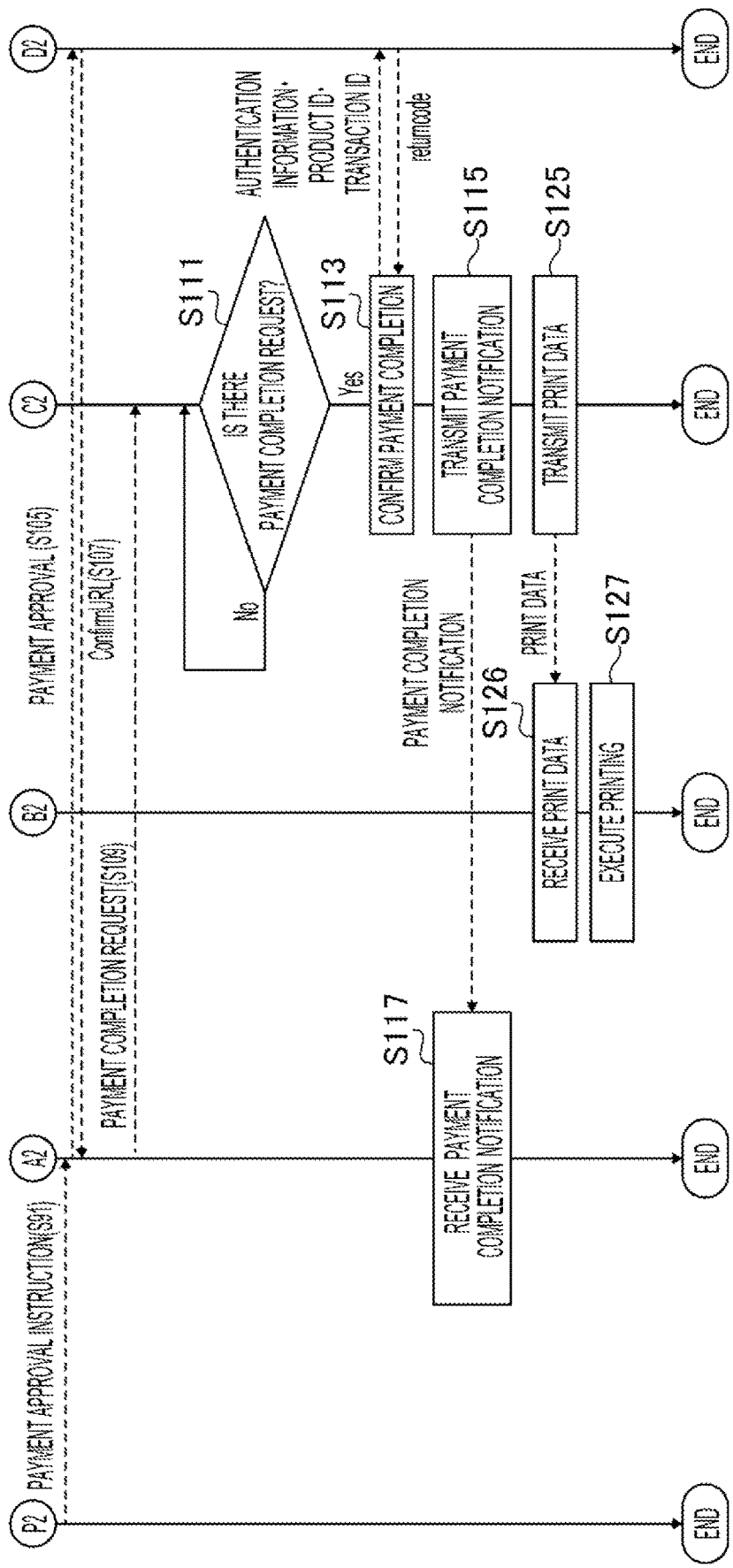

FIG. 12 is a sequence chart illustrating processes performed by the mobile terminal, the MFP, the data processing server and the transaction server.

Figure 13:
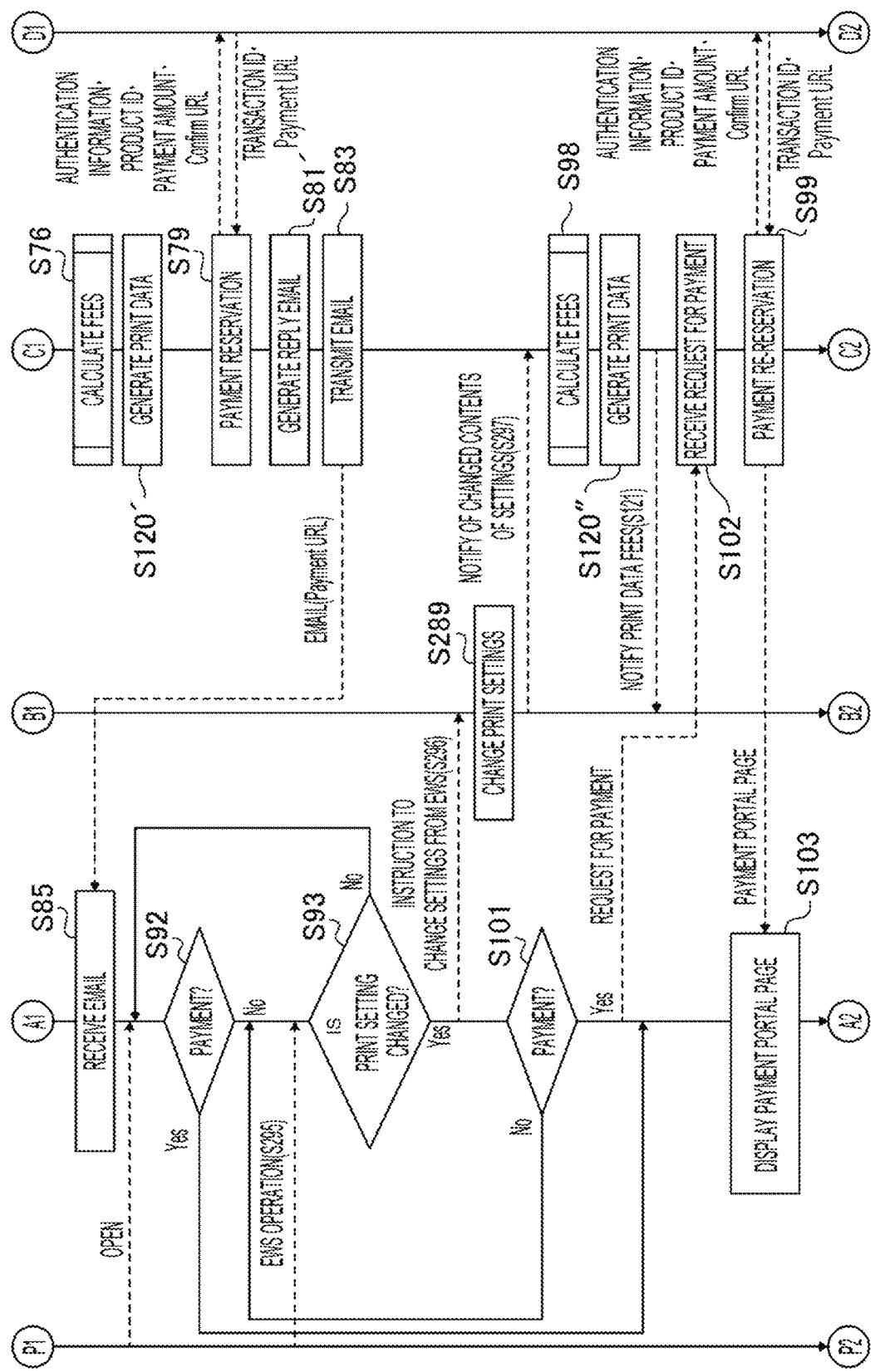

FIG. 13 is a sequence chart illustrating processes performed by the mobile terminal, the MFP, the data processing server and the transaction server according to a modification in which print settings are changed using an EWS.

Figure 14:
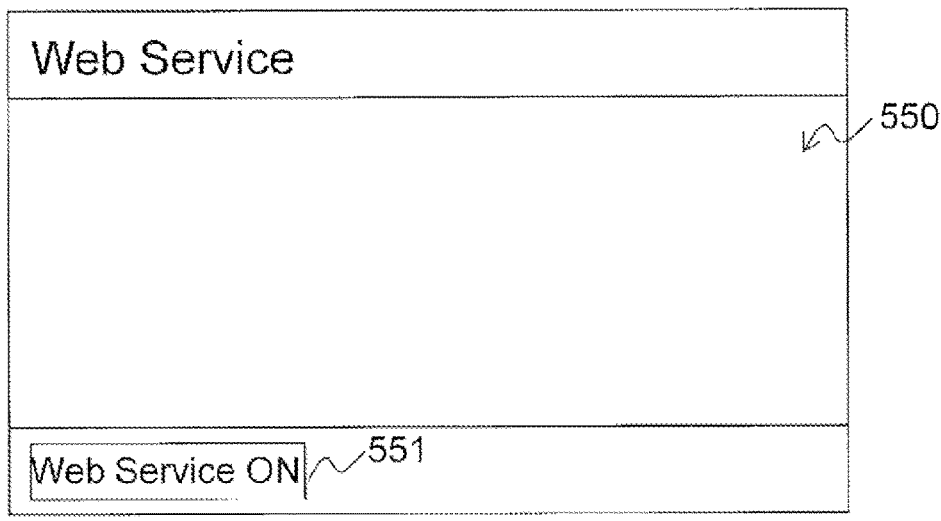

FIG. 14 is an example of a Web service page displayed on the mobile terminal or the like by accessing a particular URL indicated in a file for the EWS.

Figure 15:
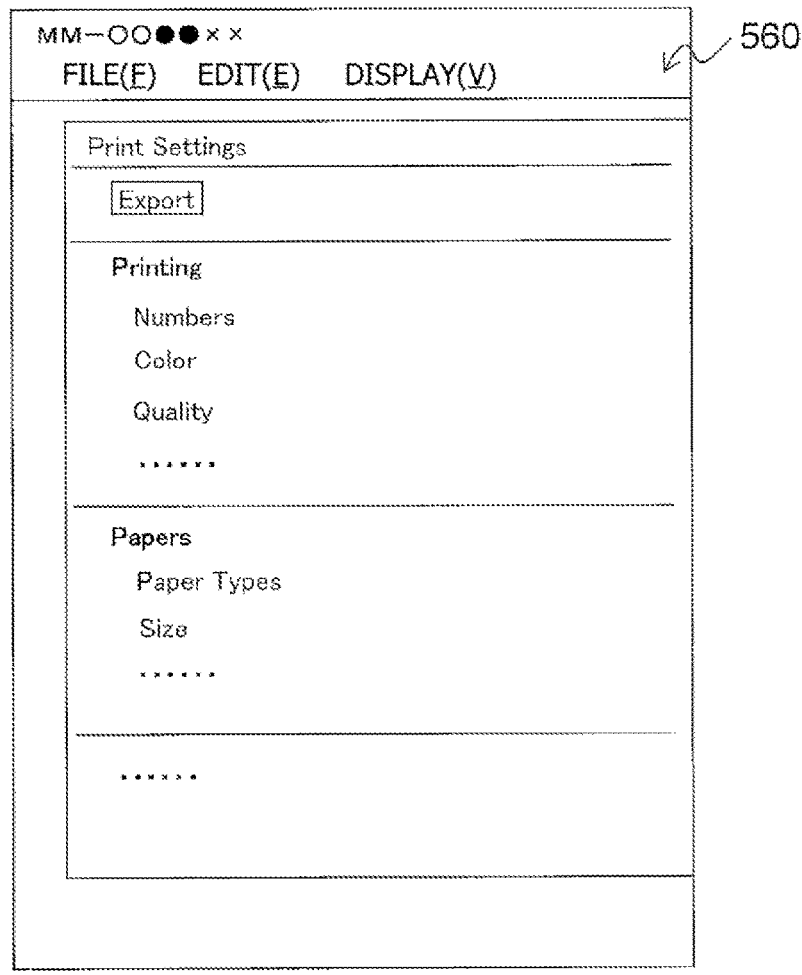

FIG. 15 is an example of a print setting page displayed on the mobile terminal or the like.

Figure 16:
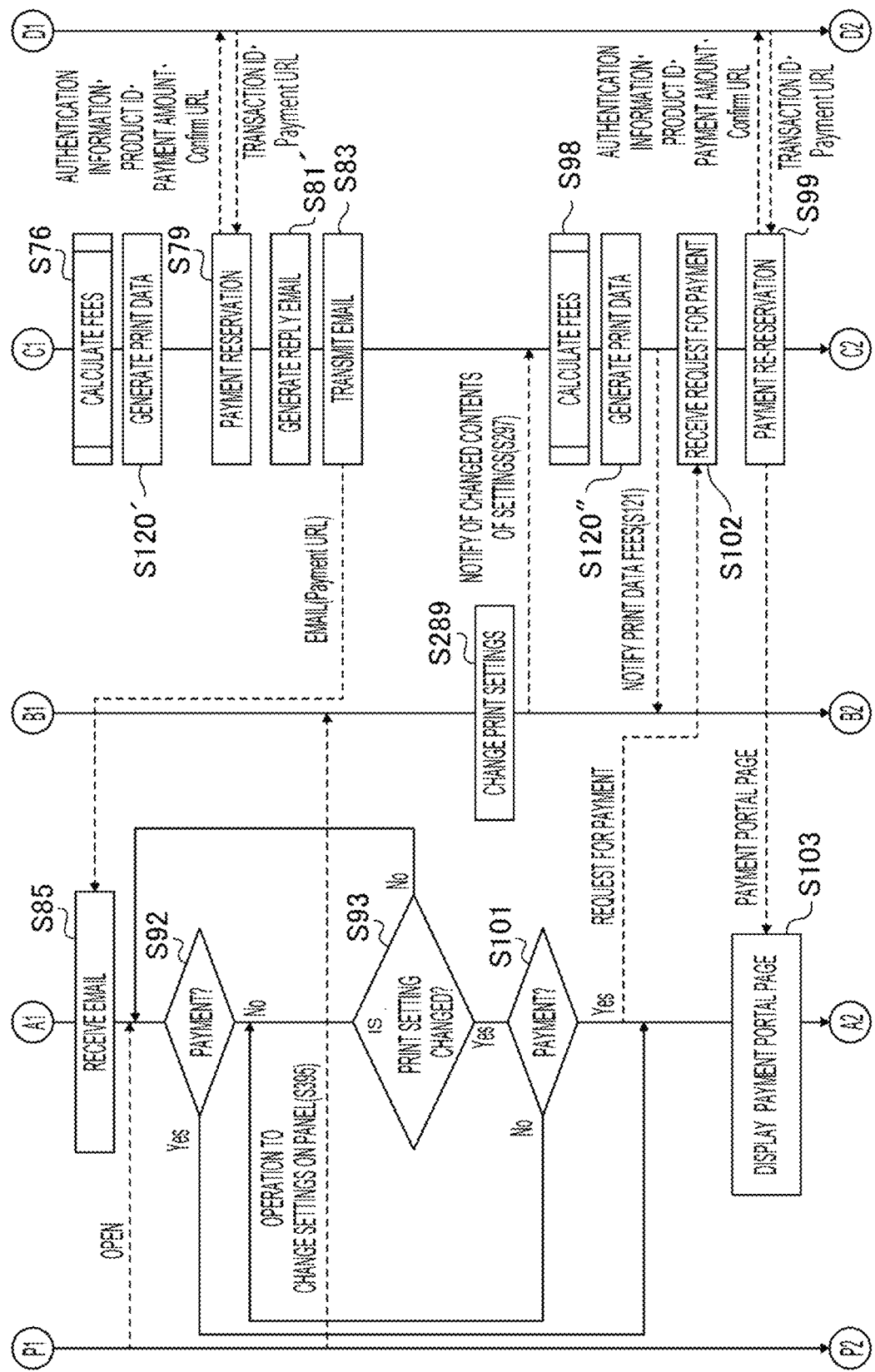

FIG. 16 is a sequence chart illustrating processes performed by the mobile terminal, the MFP, the data processing server and the transaction server according to a modification in which print settings are changed by operating a touchscreen panel of the MFP.

Figure 17A:
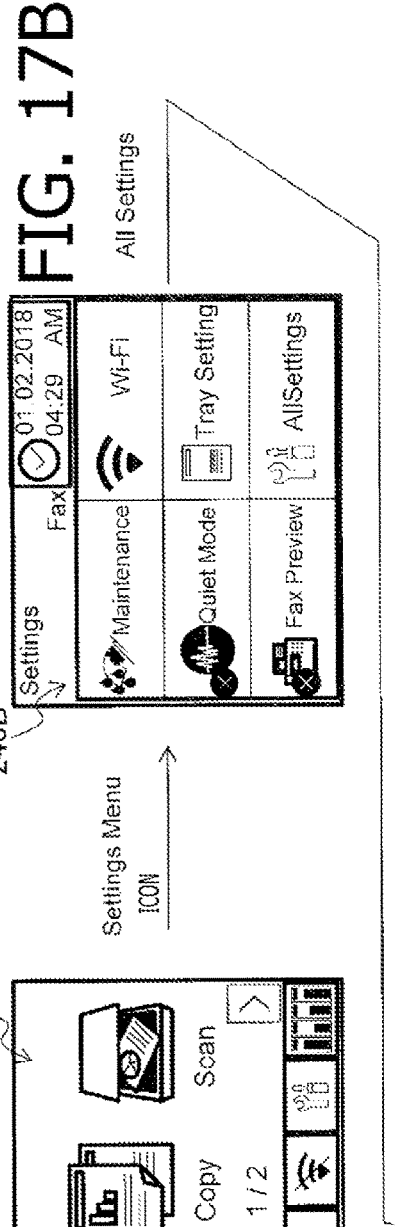
Figure 17B:
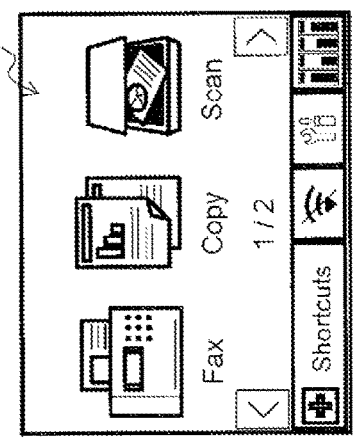
Figure 17C:
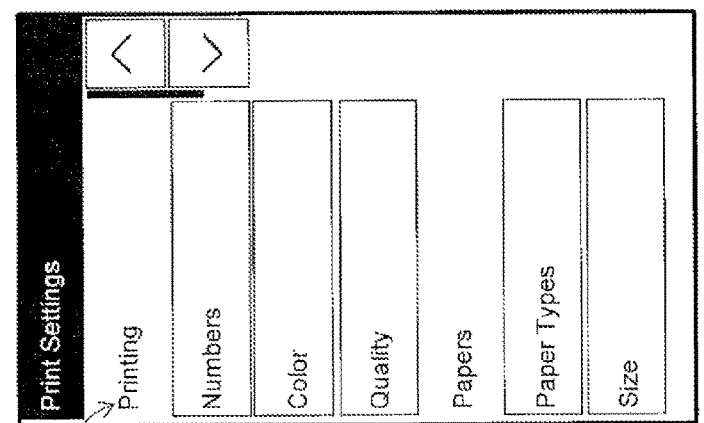

FIGS. 17A-17C are diagrams illustrating transitions of the screen in response to operations of the touchscreen panel.

Figure 18:
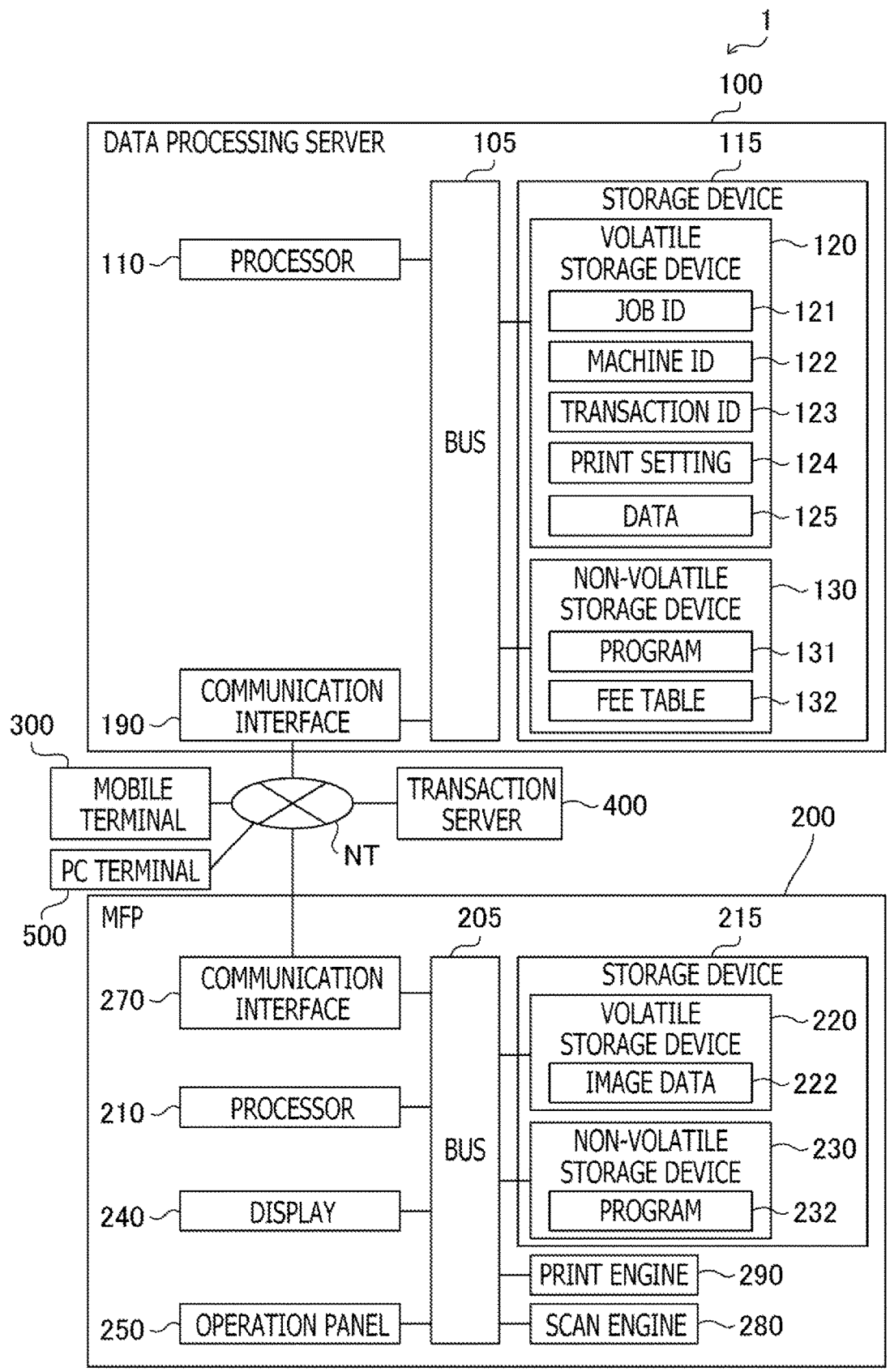

FIG. 18 is a block diagram showing an overall configuration of a printing system.

Figure 19:
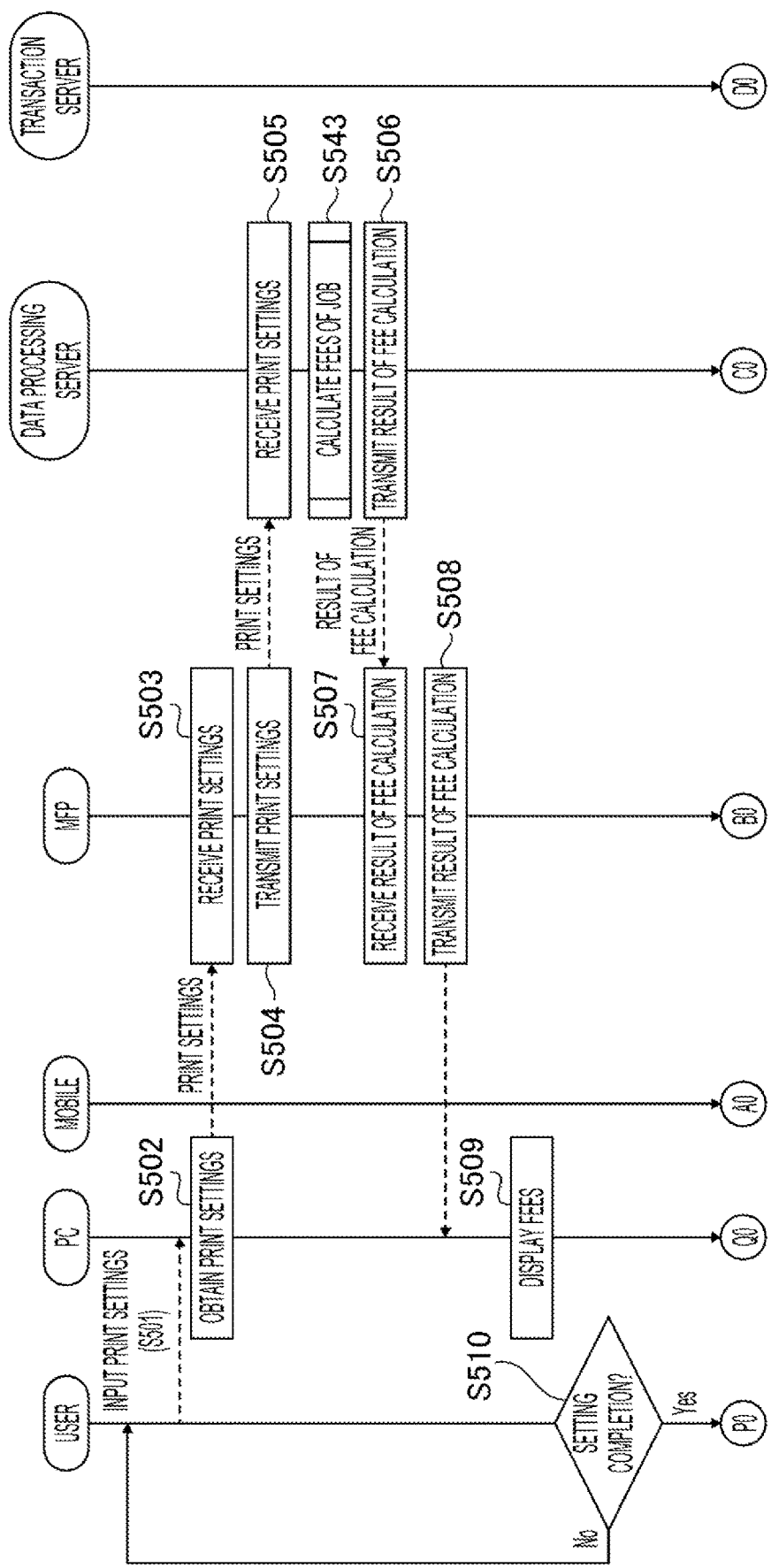

FIG. 19 is a sequence chart illustrating processes performed by a PC terminal, a mobile terminal, an MFP, a data processing server and a transaction server.

Figure 20:
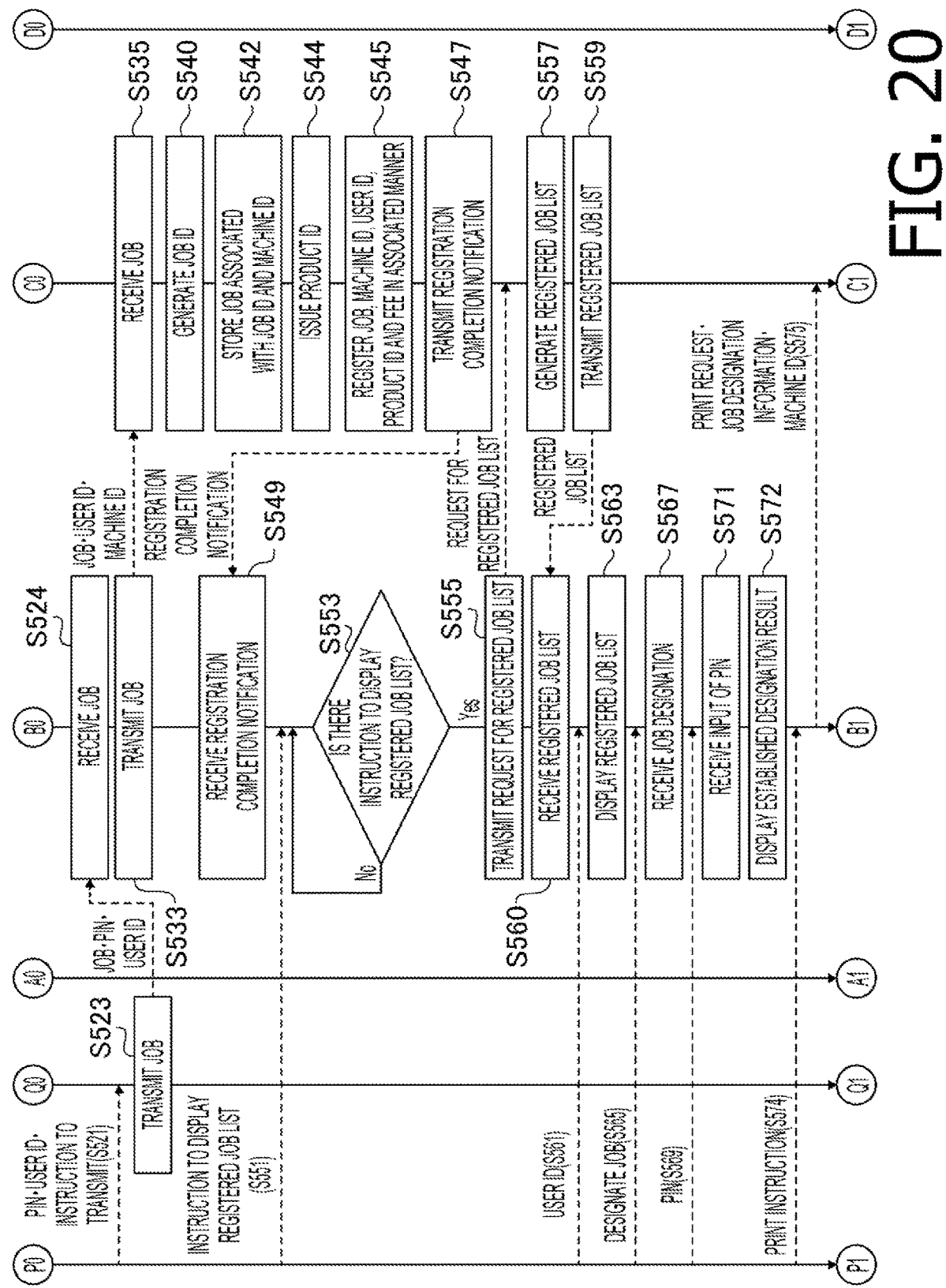

FIG. 20 is a sequence chart illustrating processes performed by a PC terminal, a mobile terminal, an MFP, a data processing server and a transaction server.

Figure 21:
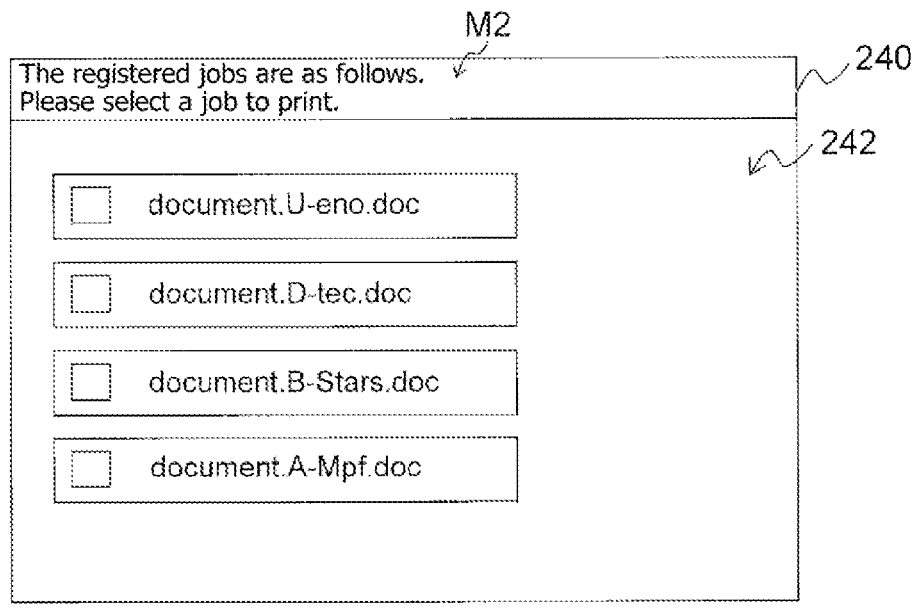

FIG. 21 is an example of a registered job list display screen that is displayed on a display of the MFP.

Figure 22:
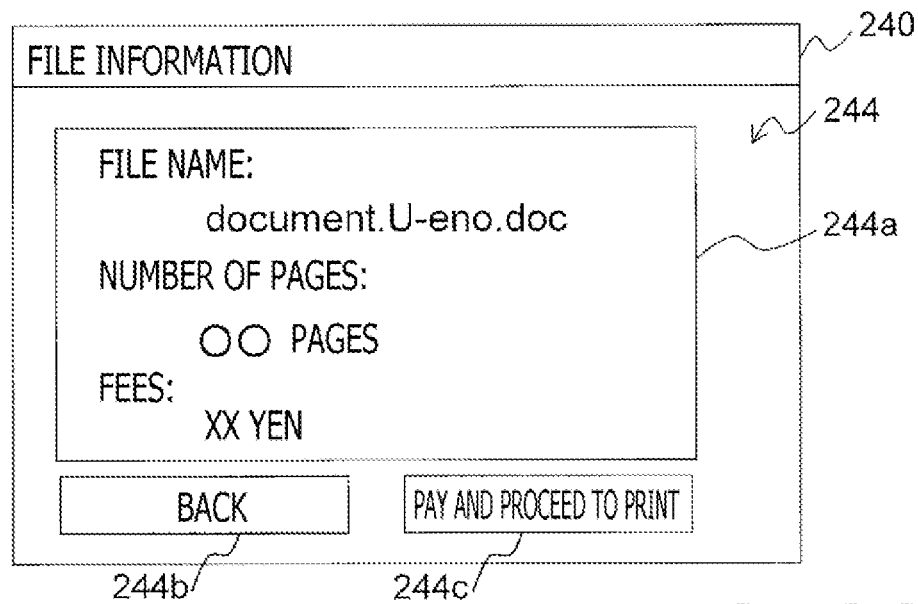

FIG. 22 is an example of a file information display screen that is displayed on the display of the MFP.

Figure 23:
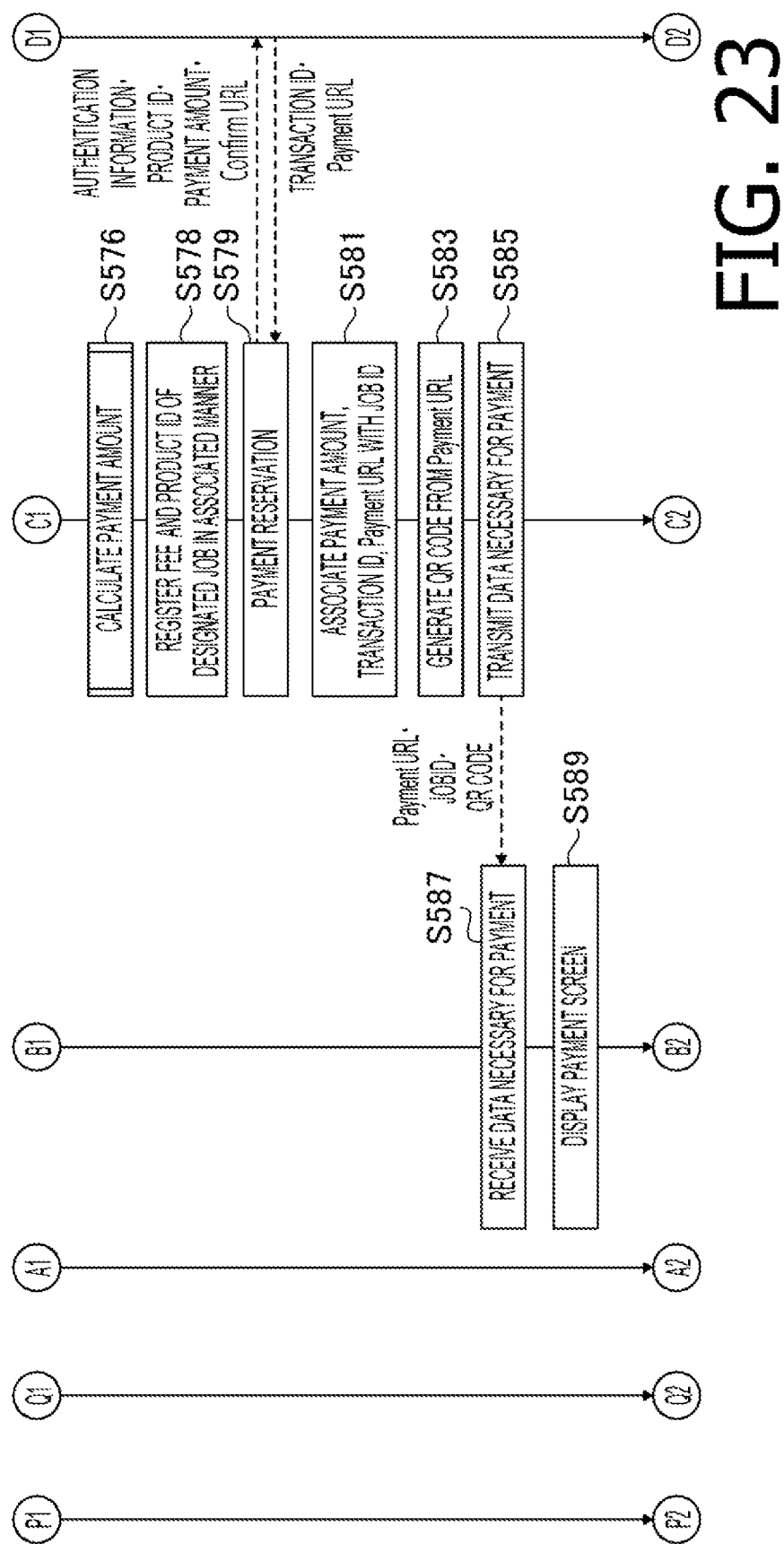

FIG. 23 is a sequence chart illustrating processes performed by the PC terminal, a mobile terminal, an MFP, a data processing server and a transaction server.

Figure 24:
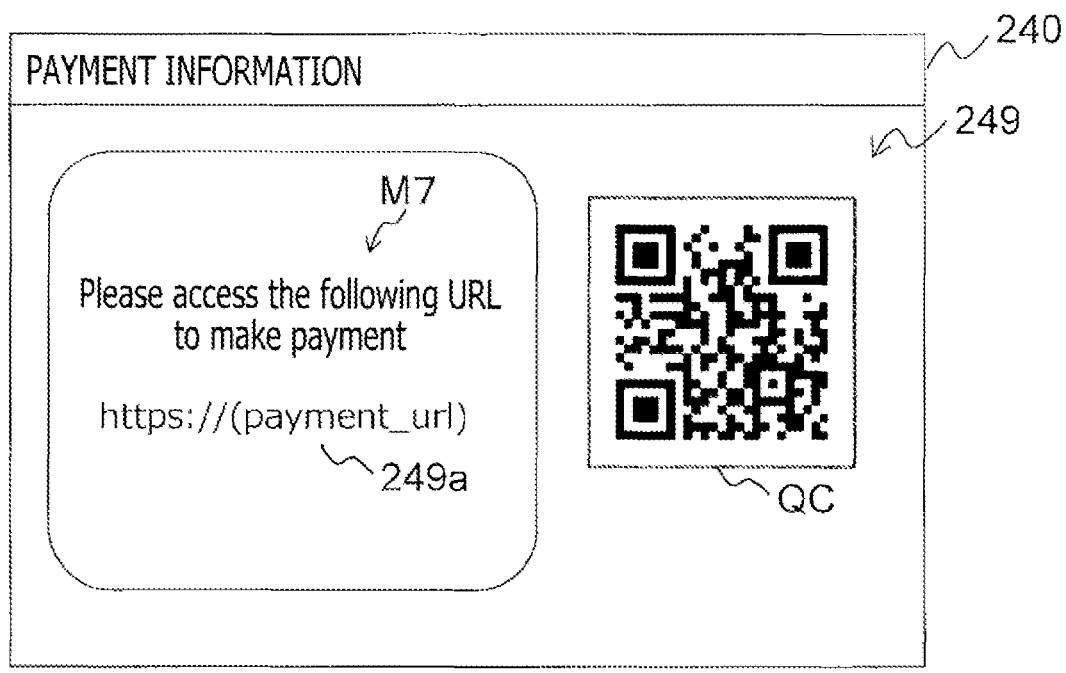

FIG. 24 is an example of a payment screen displayed on the display of the MFP.

Figure 25:
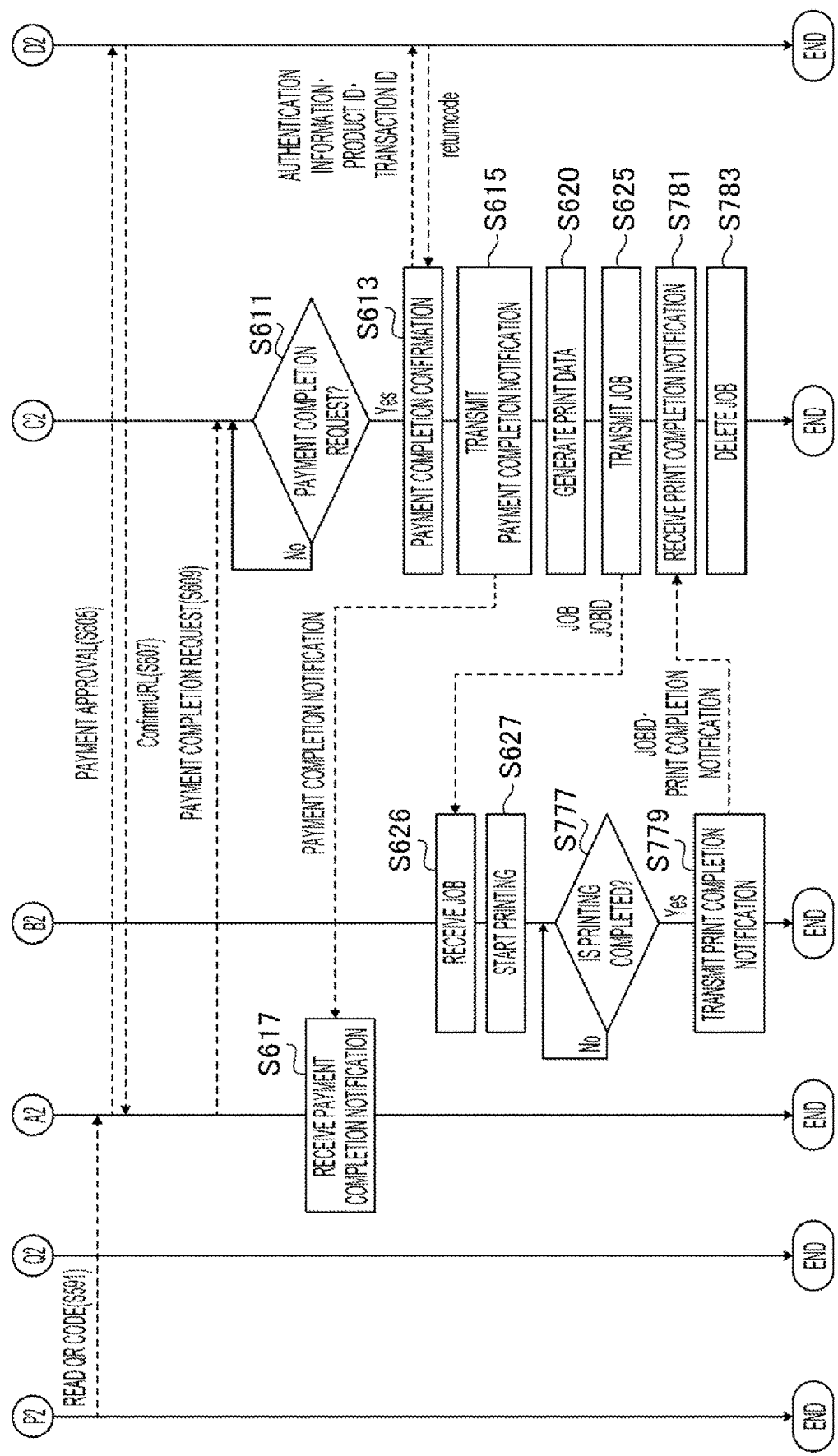

FIG. 25 is a sequence chart illustrating processes performed by the PC terminal, a mobile terminal, an MFP, a data processing server and a transaction server.

Figure 26:
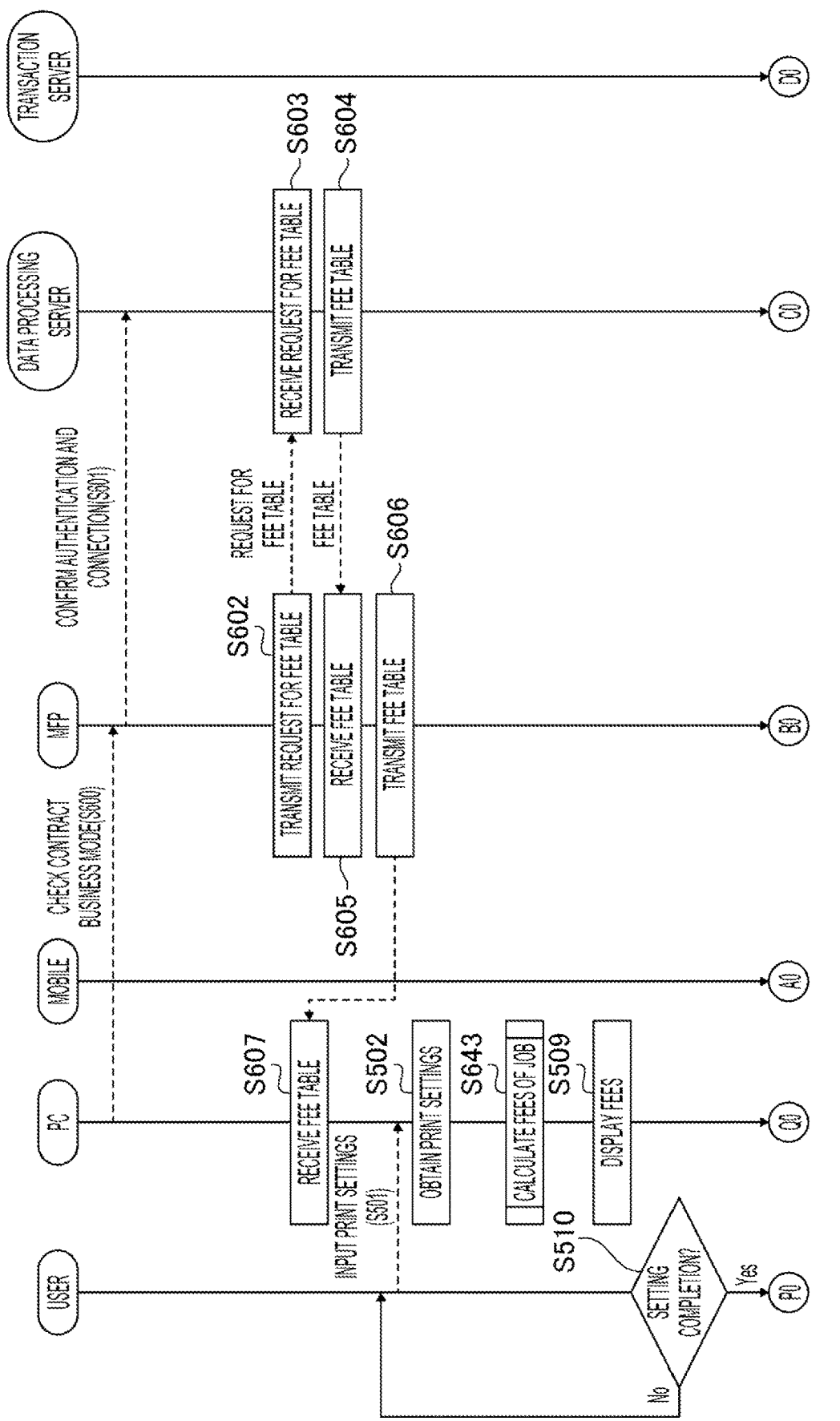

FIG. 26 is a sequence chart illustrating processes performed by the PC terminal, a mobile terminal, an MFP, a data processing server and a transaction server according to a modification in which the PC terminal obtains a fee table and performs a fee calculation.

Figure 27:
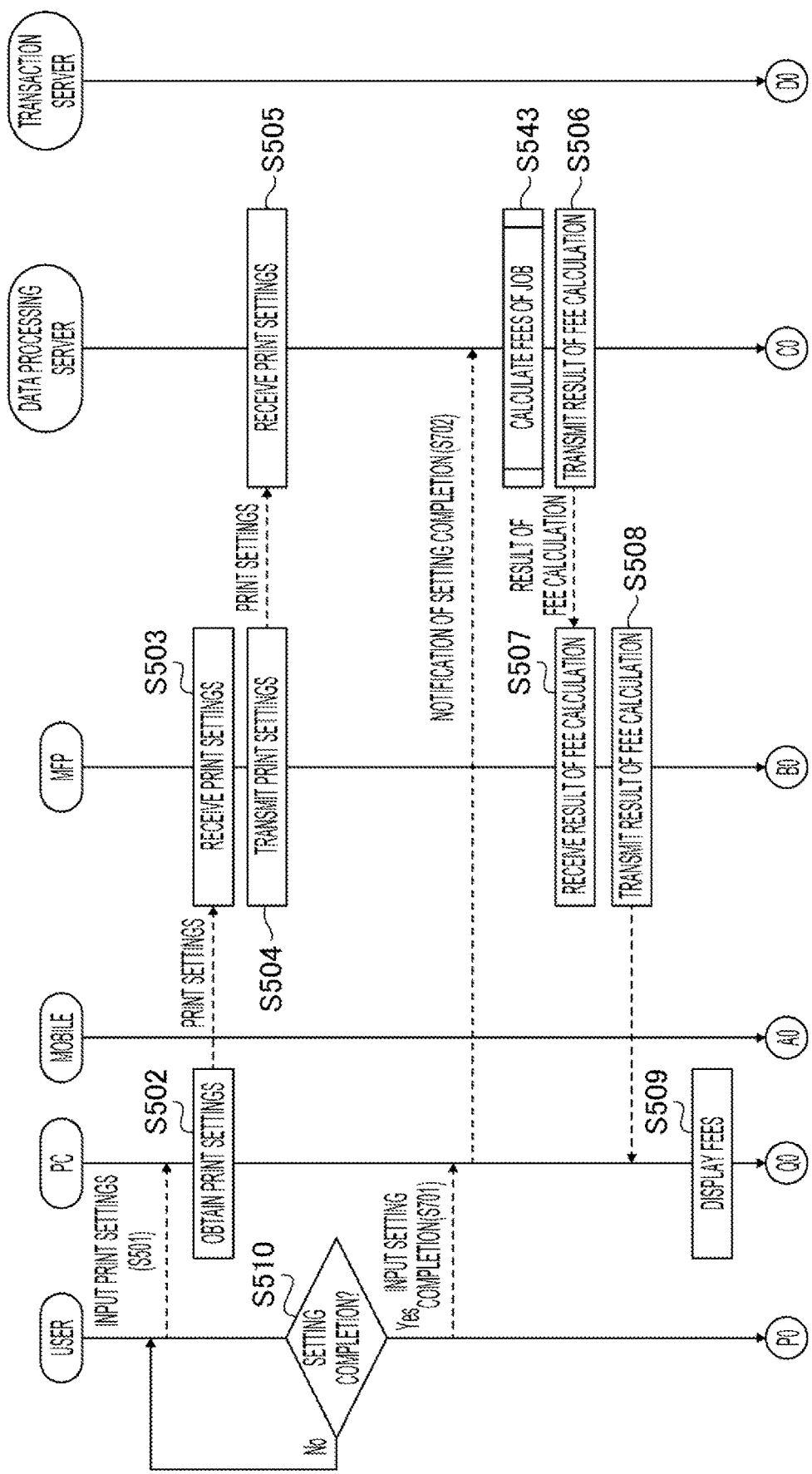

FIG. 27 is a sequence chart illustrating processes performed by the PC terminal, a mobile terminal, an MFP, a data processing server and a transaction server according to a modification in which the fee calculation is performed after input of "Setup Completion."

FIG. 28 is a sequence chart illustrating processes performed by the PC terminal, a mobile terminal, an MFP, a data processing server and a transaction server according to a modification in which the fee calculation is performed after generation of print data.

FIG. 29 is a sequence chart illustrating processes performed by the PC terminal, a mobile terminal, an MFP, a data processing server and a transaction server according to a modification in which the fee calculation is performed after the generation of the print data.

An embodiment according to aspects of the present disclosures will be described with reference to the drawings.

Firstly, a first embodiment will be described with reference to FIGS. 1-17. The present embodiment is a printing system 1 providing a print service in which a user, who is a customer, pays a fee to use a printing function of an MFP (multi-function peripheral) 200, and the user transmits a print file to be printed by email.

Overview of Printing System

Figure 1:
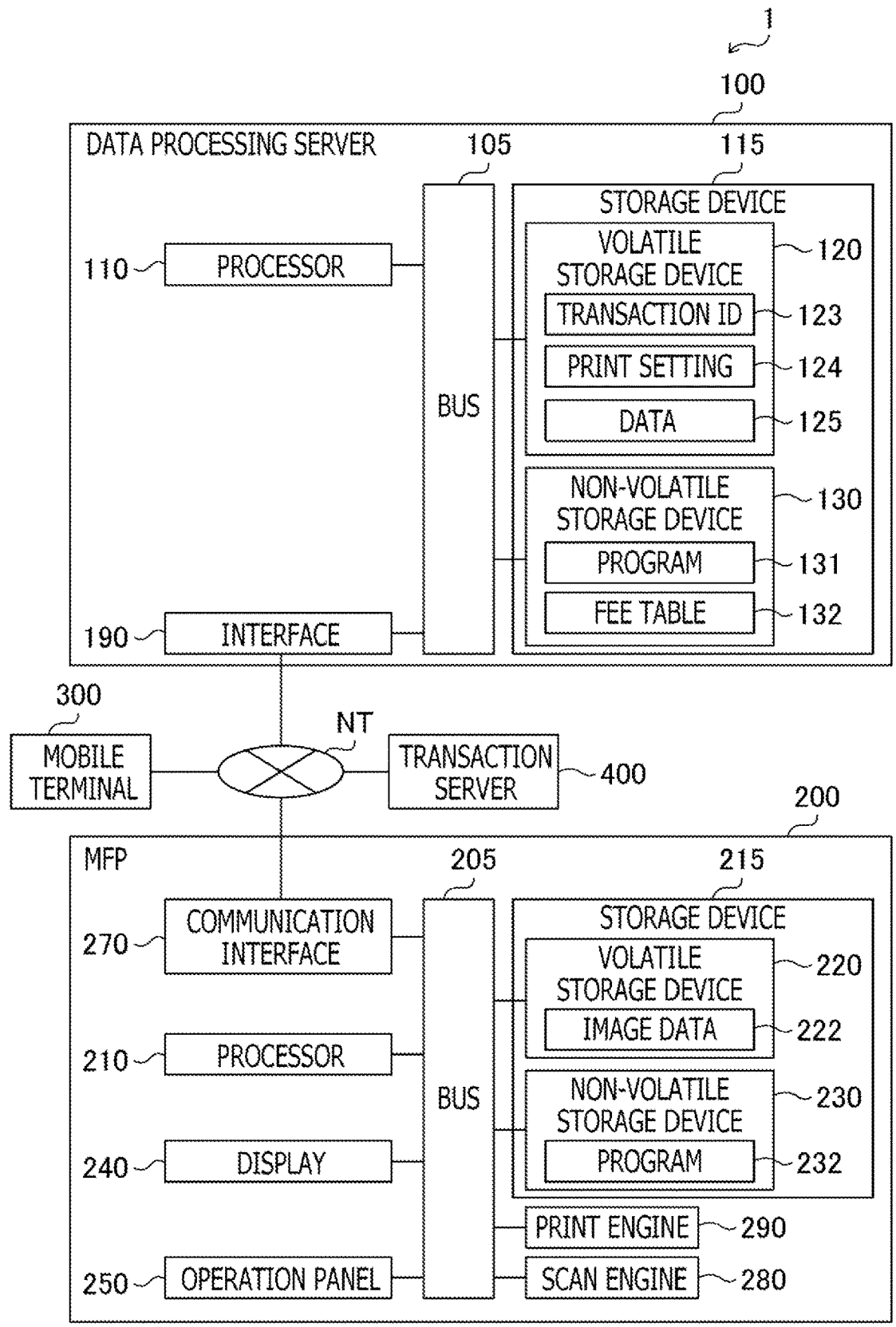
FIG. 1 is a block diagram showing an overall configuration of a printing system.

In FIG. 1, the printing system 1 includes a data processing server 100, the MFP 200, a mobile terminal 300, and a transaction server 400. The data processing server 100, the MFP 200, the mobile terminal 300, and the transaction server 400 are connected to a network NT, and communicable with each other.

Data Processing Server

The data processing server 100 is a server installed and managed, for example, by a manufacturer of the MFP 200, and provided with a processor 110, a storage device 115 and an interface 190. The processor 110 is an example of a second controller, and the interface 190 is an example of a communication I/F (interface). The processor 110, the storage device 115, and the interface 190 are interconnected via a bus 105.

The storage device 115 is provided with a volatile storage device 120 and a non-volatile storage device 130. The volatile storage device 120 is, for example, a DRAM which has a transaction ID storage area 123, a print setting storage area 124, and a data storage area 125. The non-volatile storage device 130 is, for example, a hard disk drive or a solid state drive, and has a program storage area 131 storing various programs, and a fee table storage area 132. Contents stored in respective storage areas will be described later.

Among various programs stored in the program storage area 131, a print processing program related to execution of sequence charges shown in FIGS. 2, 5, 8, 10, 12, 13, 16, 19, 20, 23, 25, 26, 27, 28, 29, and the like, described later, have been stored in the non-volatile storage device 130 in advance.

The processor 110 is a device performing data processing, and is, for example, a CPU. The processor 110 executes the information processing program mentioned above, which is stored in the program storage area 131, to perform a print processing method of the printing system according to the present embodiment in association with a processor 210 (described later) of the MFP 200. In this way, various processes shown in FIGS. 2, 5, 8, 10, 12, 13, 16, 19, 20, 23, 25, 26, 27, 28, 29, and the like, and including a data communication with the mobile terminal 300, the MFP 200, and the transaction server 400 connected to the network NT, are performed.

The interface 190 may be a wired LAN interface or a wireless interface to communicate with other devices, and connected to the network NT.

Transaction Server 400

The transaction server 400 is located, for example, in a company that provides an online payment service using an appropriate payment application program as described later, and has a processor, a storage device, and an interface for connecting to the network NT (not shown).

MFP

The MFP 200 is owned, for example, by a business provider of the above printing services. The MFP 200 is an example of a printing device. The MFP 200 has a scan engine 280, a print engine 290, a processor 210, a storage device 215, a display 240, a user-operable operation panel 250, and a communication interface 270. The scan engine 280, the print engine 290, the processor 210, the storage device 215, the display 240, the user-operable operation panel 250, and the communication interface 270 are interconnected via a bus 205.

The storage device 215 includes a volatile storage device 220 and a non-volatile storage device 230. The volatile storage device 220 is, for example, a DRAM, which has a data storage area 222 configured to store image data. The non-volatile storage device 230 is, for example, a flash memory. The non-volatile storage device 230 has a program storage area 232. Among various programs stored in the program storage area 232, a printing program related to execution of sequence charges in FIGS. 2, 5, 8, 10, 12, 13, 16, 19, 20, 23.25, 26, 27, 28, 29, and the like, have been stored in advance in the non-volatile storage device 230, for example, as firmware.

The processor 210 is a device configured to perform data processing, and is, for example, a CPU. The processor 210 is configured to execute the print processing program stored in the program storage area 232, and performs a printing method according to the printing system 1 of the present embodiment in association with the processor 210. In this way, the processor 210 is configured to cause the print engine 290 to form an image based on image data transmitted form the mobile terminal 300. It is noted that the processor 210 is an example of a first controller. It is also noted that, in the present specification, to form an image on a printing paper will occasionally be referred to as simply as "to print" or the like.

The display 240 is, for example, an LCD (liquid crystal display). The operation panel 250 is a device configured to receive operations by a user. The user can input various instructions to the MFP 200 by operating the operation panel 250. The communication interface 270 is a wireless or wired network interface to communicate with another device, and is connected to the network NT.

The scan engine 280 is configured to optically read an original, which is subject to the scanning, with a photoelectric conversion device such as a CCD or a CMOS, and generate image data representing read image.

The print engine 290 is configured to pick up and convey a printing paper accommodated in a paper feed tray with a conveying mechanism (not shown), and print an image on the conveyed printing paper in accordance with a particular method. In the following description, a case where printing is performed in accordance with an inkjet method will be described as an example. It is noted that the printing paper is an example of a printing medium.

Mobile Terminal

The mobile terminal 300, in this example, is a user-owned mobile terminal such as a smartphone, which is connected to the network NT via the wireless communication. The mobile terminal 300 has a storage device and an interface to connect to the network NT (not shown). The mobile terminal 300 is an example of an external device. It is noted that, as the external device, other information terminals such as a personal computer, a tablet computer or the like, may be used instead of the mobile terminal 300.

Processing of Print File Using Mail Attachment

In the printing system 1 configured as described above, according to the present embodiment, the mobile terminal 300 transmits email, to which the print file containing image data is attached, to the data processing server 100, thereby printing of the print file being performed by the MFP 200. Further, processing related to the payment of a printing fee at that time is carried out by so-called electronic payment. Hereafter, the details will be explained step by step.

Process Flow

The control sequence of the processes performed by the processor 210 of the MFP 200, the processor 110 of the data processing server 100, the processor of the transaction server 400, and the processor of the mobile terminal 300 according to the present embodiment will be described with reference to FIGS. 2, 5 and 8. In the following descriptions of FIGS. 2, 5 and 8, descriptions of each processor are omitted and expressions such as "in the processor of the MFP 200," "by the processor of the MFP 200," and the like are simply expressed as "in the MFP 200," "by the MFP 200," and the like.

Transmitting/Receiving of Print Job

Figure 2:
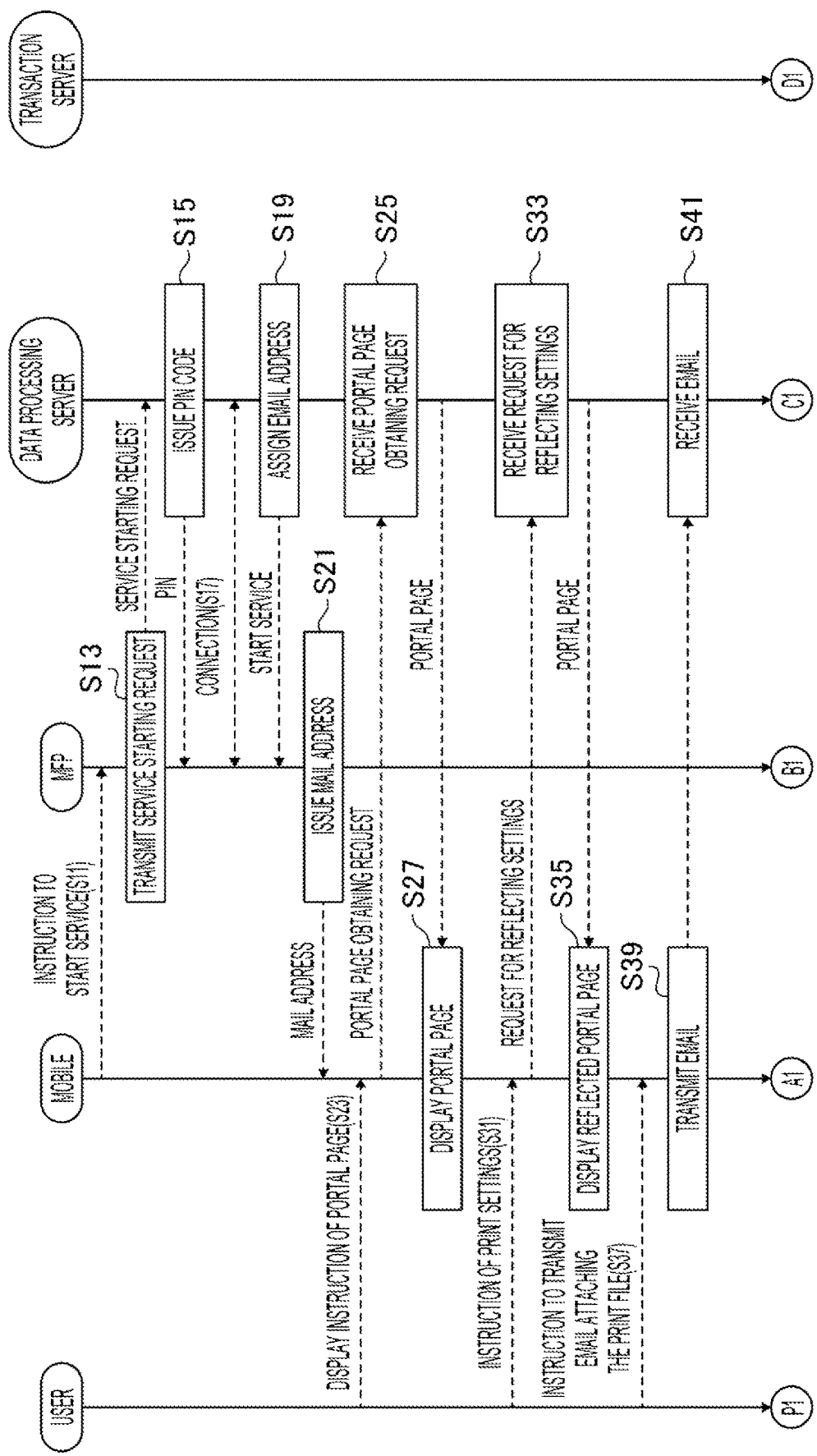
FIG. 2 is sequence chart illustrating processes performed by a mobile terminal, an MFP (multi-function peripheral), a data processing server and a transaction server.

In FIG. 2, the user firstly appropriately operates the mobile terminal 300 or another appropriate terminal or the like to connect the MFP 200 with the data processing server 100 to start a service according to the above-described print processing method according to aspects of the present disclosures (S11). From the MFP 200, according to the above, a service starting request is transmitted, which is received by the data processing server 100 (S13).

In response to receipt of the service start request, a PIN code is issued by the data processing server 100, which is received by the MFP 200 (S15). By using the PIN code, the connection of the wireless communication between the MFP 200 and the data processing server 100 is established (S17). After the connection is established, the data processing server 100 assigns an email address to the MFP 200, and the above-mentioned service is started (S19). In response to the start of the service, in the MFP 200, the assigned email address is issued, which is transmitted to the mobile terminal 300 and the like (S21). The email address assigned to the MFP 200 will be simply referred to as "an email address of the MFP 200" in the following description. It is noted that the email address of the MFP 200 is an example of an email address for the printing device.

Thereafter, when the user performs appropriate operations via the mobile terminal 300 and the like, the user accesses a URL of a print setting page of a portal site to perform print settings when the printing is performed by the MFP 200, and a display instruction requesting to display the print setting page is made (S23). It is noted that the above URL is an example of a first URL, which will be referred to simply as a "first URL" in the following description. From the mobile terminal 300, in response to the above request, a portal page obtaining request is transmitted, which is received by the data processing server 100 (S25). As display data of the portal page corresponding to the portal page obtaining request is output from the data processing server 100 to the mobile terminal 300, a portal page for the print setting is displayed by the mobile terminal 300 (S27).

Figure 3:
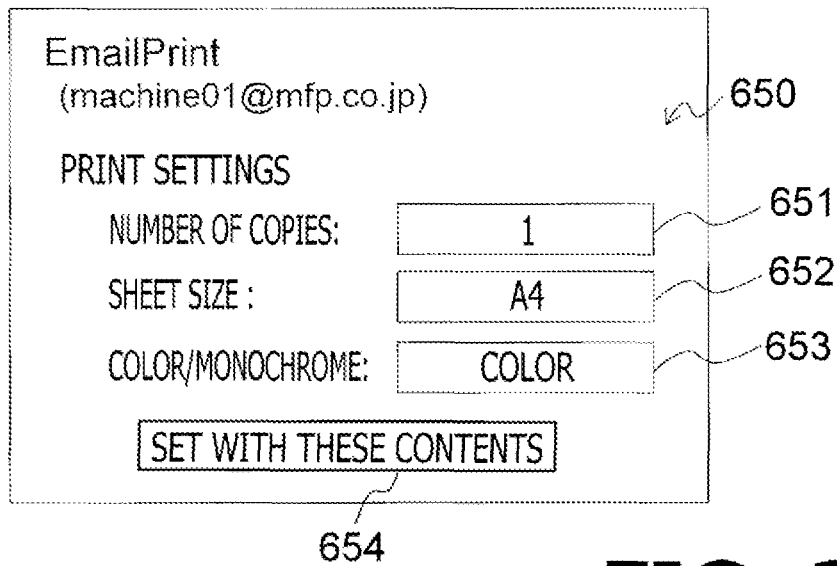
FIG. 3 is an example of a print setting portal page displayed on the mobile terminal.

FIG. 3 shows an example of the print setting portal page 650 described above that is displayed on the mobile terminal 300. For performing the above print settings, the print setting portal page 650 has a number of copies setting field 651 for entering the number of copies to be printed, a paper size setting field 652 for selecting the paper size, and a print color setting field 653 for selecting a print color setting, which represents color or monochrome printing. In this example, "1" is set in the number of copies setting field 651, "A4" is set in the paper size setting field 652, and "color" is set in the print color setting field 653. The number of copies, paper size, and print color are only examples, and although not show in the drawings, there are also other settings such as a paper type setting field for selecting a plain paper or a glossy paper, a print quality setting field for selecting a "normal" mode or a "highl quality" mode, and a border setting field for selecting printing with or without borders, and the like. The set contents in all the setting fields including the above setting fields 651, 652 and 653 are examples of print setting values. In other words, the "print setting values" are not limited to those expressed numerically, such as the contents of the number of copies setting field 651, but also include setting factors that can be selected and/or specified by the user, such as the contents of the paper size setting field 652, the print color setting field 653, the paper type setting field, the print quality setting field, and the borders setting field, which are expressed in a non-numerical form such as kind or type.

In the print setting portal page 650, in addition to the above-described setting fields 651, 652 and 653, a "set with these contents" button 654 is provided. After making desired setting in each of the fields 651, 652 and 653, when the user operates the "set with these contents" button 654, an instruction of the print settings is made (S31), a request for reflecting the settings is transmitted from the mobile terminal 300, that is received by the data processing server 100 (S33). In response to this, as the data processing server 100 outputs the display data of the portal page reflecting the above print settings to the mobile terminal 300, the portal page for the reflected print settings is displayed on the mobile terminal 300 (S35).

Figure 4:
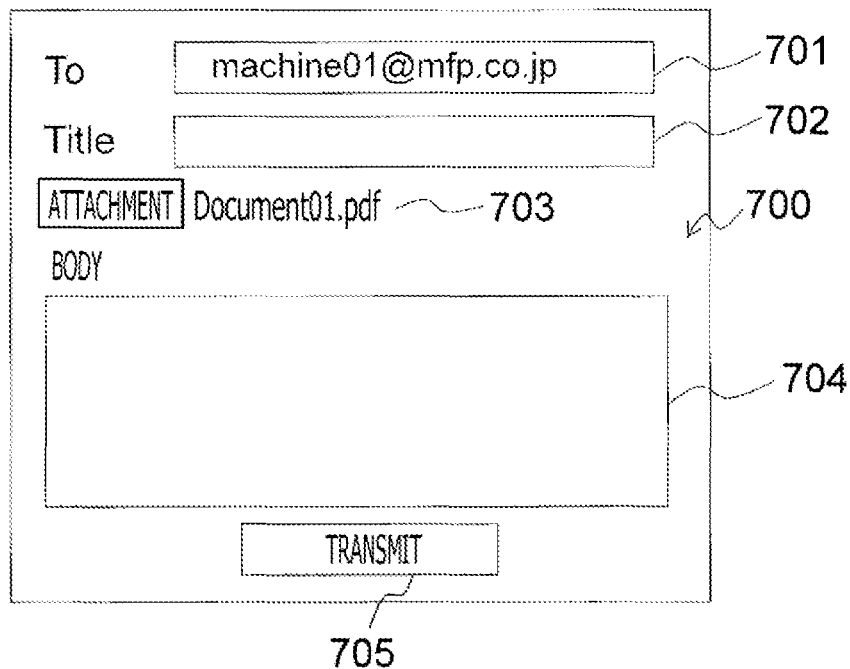
FIG. 4 is an example of a mail transmission screen displayed on the mobile terminal.

As above, the print setting for the MFP 200 when the printing is performed is completed. In this state, by operating the mobile terminal 300 as appropriate, the user sends an email with an attached print file containing the desired image data to be printed by the MFP 200 to the email address received in S21 above. FIG. 4 shows an example of a mail transmission screen that is displayed at this stage by appropriate mailing software on the mobile terminal 300.

In FIG. 4, the mail transmission screen 700 includes a destination display field 701, a subject field 702, an attached file display field 703, a body field 704, and a "Transmit" button 705. In this example, in the destination display field 701, an email address of the MFP 200, that is, "machine01@mfp.co.jp" has been entered as the destination, and a file name "Document01.pdf" has been entered in an attached file display field 703 which is the name of the print file attached to this mail and contains image data. By an appropriate operation by the user on the mobile terminal 300, when the "Transmit" button 705 is clicked, transmission of the email attaching the print file "Document01.pdf" is instructed (S37), and the email is transmitted from the mobile terminal 300 (S39). As mentioned above, the email address at this stage is the address assigned to the MFP 200 by the data processing server 100. However, it is configured in advance that the email transmitted to the email address is received by the data processing server 100, and is stored in a particular area of the data processing server 100. That is, the email transmitted from the mobile terminal 300 as mentioned above is received by the data processing server 100 (S41). This email is an example of a first email, and a process performed in S41 is an example of a mail receiving process. It is noted that the format of the print file may be any format if the file can be printed by the MFP 200, and the file format may be a "jpeg" format, a "pdf" format, a "tiff" format, a "gif" format and the like.

Figure 5:
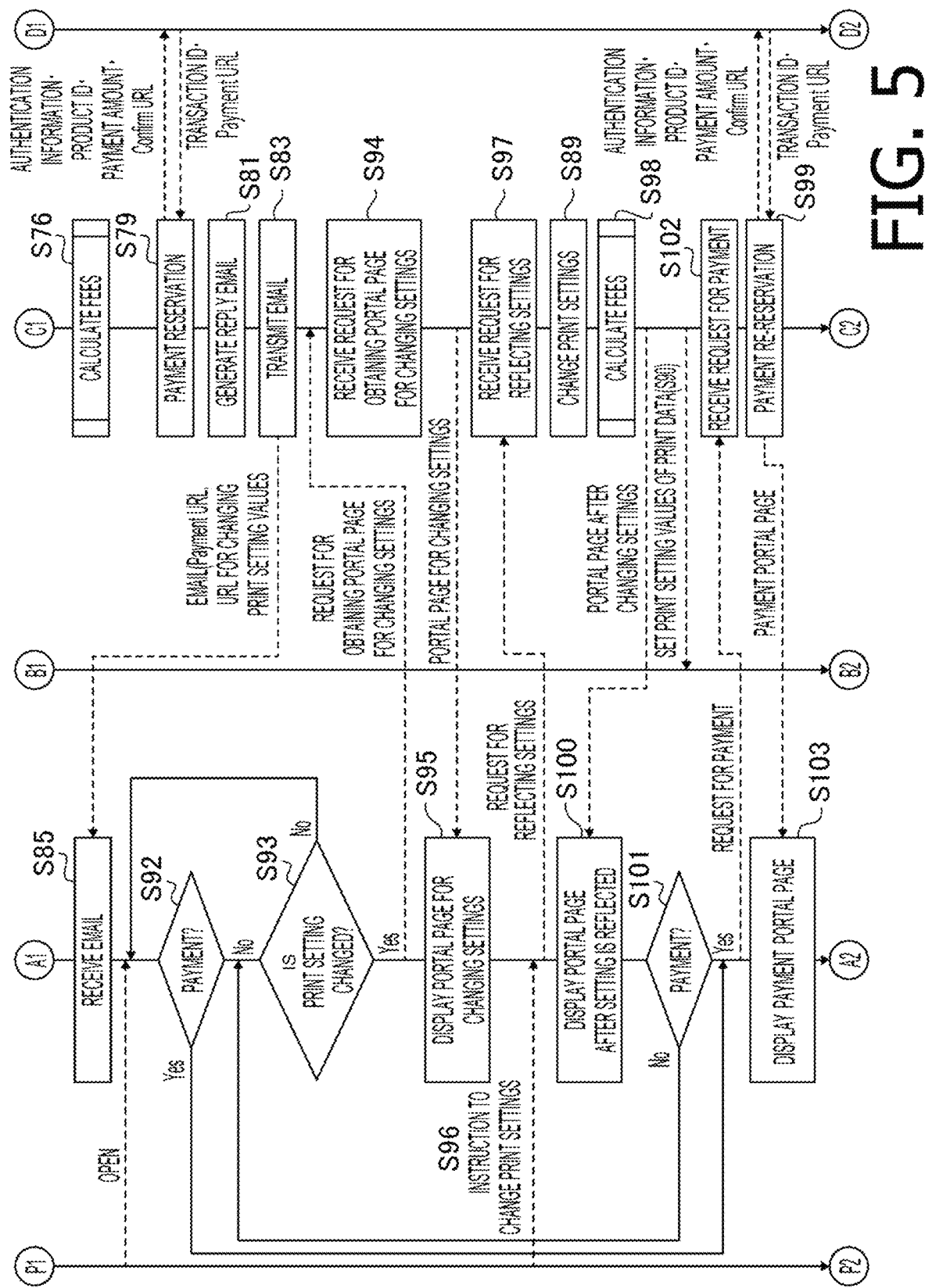
FIG. 5 is sequence chart illustrating processes performed by the mobile terminal, the MFP, the data processing server and the transaction server.

Moving to FIG. 5, in the data processing server 100, the print file attached to the email received in S41 above is analyzed in S76, and the fee to be charged to the user for printing the image data contained in the print file is calculated. This amount is an example of a first amount, and is hereinafter referred to simply as the "first amount." Further, a process performed in S76 is an example of a first fee determining process. In this calculation, for example, the fee is calculated based on a particular fee table stored in the fee table storage area 132 of the volatile storage device 120. At that time, the calculation is performed by taking into account the print setting values in each of the setting fields 651, 652, 653, and the like of the above-mentioned portal page 650 for print settings and received in S33 described above. That is, in the above fee table, a particular correlation regarding at least one of the print setting values of basic information such as the number of pages, the number of copies, the paper size, the printing color, and the type of printing paper, and extensive information including, for example, the duty ratio of image data, print coverage, and the like are set. When the value of the at least one print setting is determined, a corresponding fee can be calculated by substituting the determined value into the particular correlation. It is noted that the fee table is an example of fee determining information.

Thereafter, in S79, a payment reservation process is performed in the data processing server 100. Concretely, a product ID issued for the execution of the service to print the image data of the above print file, the amount paid by the user that is the result of the calculation in S76, authentication information to be used for authentication at the transaction server 400, and a URL for confirming the completion of payment (in this embodiment, the URL of the data processing server 100) are transmitted to the transaction server 400. Further, the Payment URL for the user to access and pay the fee and the transaction ID related to the fee payment procedure which are transmitted in response to the above transmission from the transaction server 400 are received by the data processing server 100.

Thereafter, in the data processing server 100, a reply email to the mobile terminal 300, in which email the payment amount that is the result of the calculation in S76, and the above Payment URL obtained in S79 are described is generated (S81). Further, in this S81, the URL to access the portal page for the user to change the print setting values related to the first amount above and received in S33 to desired values is also included in the return email. This URL is an example of a third URL, and in this embodiment, this URL is hereinafter referred to simply as a "third URL" as appropriate. It is noted that the above Payment URL is an example of a second URL, and this Payment URL is hereinafter referred to simply as the "second Payment URL." Furthermore, the reply email is an example of a second email, and the process executed in S81 is an example of an email generating process.

Figure 6:
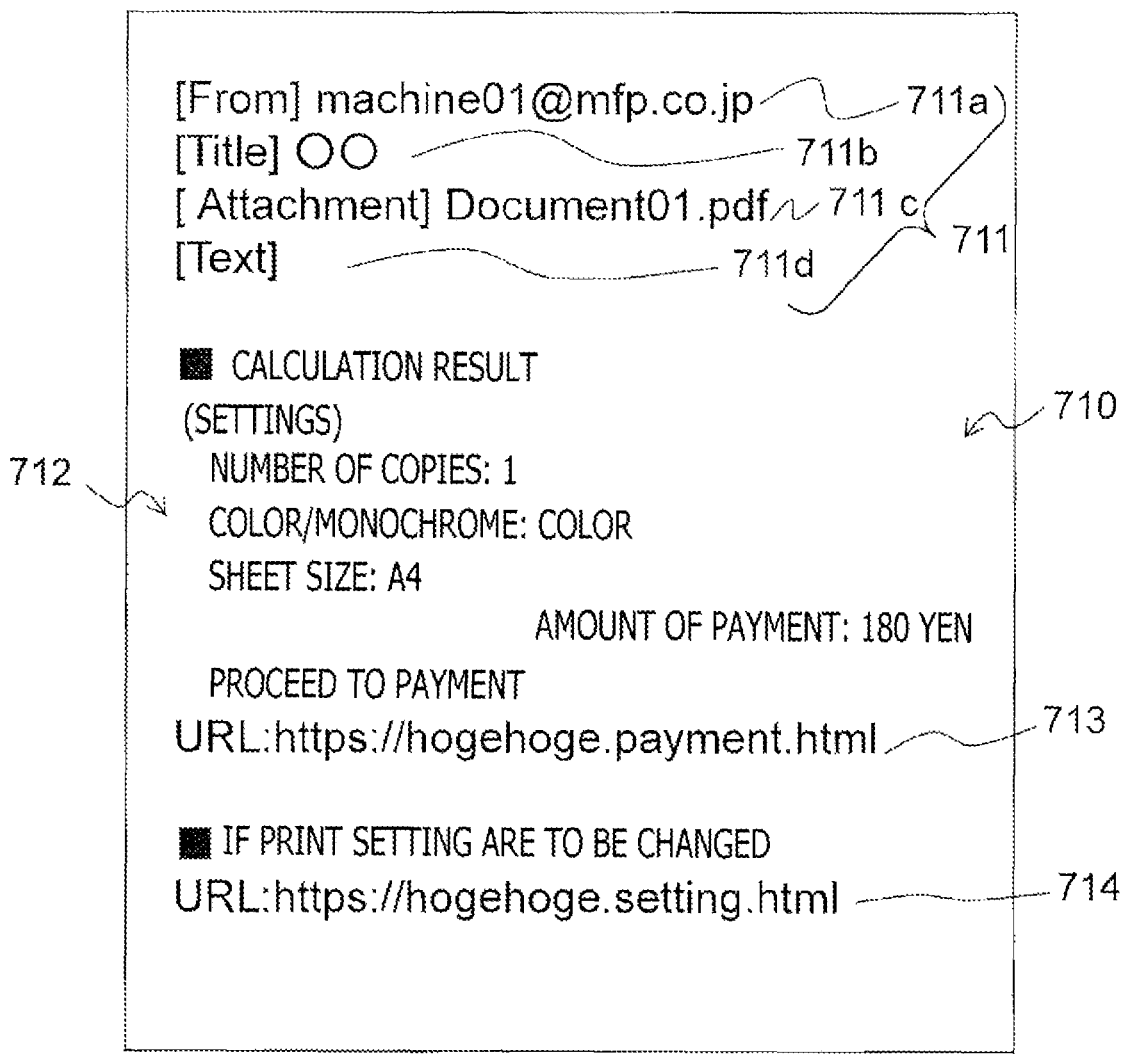
FIG. 6 is an example of a mail receiving screen displayed on the mobile terminal.

Thereafter, in the data processing server 100, the reply email generated in S81 is transmitted to the mobile terminal 300 (S83) as a reply to the email received in S41. It is noted that the process executed in S83 is an example of an email reply process. The reply email as transmitted is received by the mobile terminal 300 (S85). FIG. 6 shows an example of an email reception screen which is displayed, when the thus received email is opened, by the mailing software in the mobile terminal 300.

In FIG. 6, in the mail reception screen 710, a transmitted email display field 711, a calculation result display field 712, a payment URL display field 713 are provided.

The transmitted email display field 711 is a field for displaying the outline of the email sent from the mobile terminal 300 described above, and includes a transmission source display field 711a, a subject field 711b, an attached file display field 711c, and a body field 711d. In this example, in line with the above description, "machine01@mfp.co.jp," which is the e-mail address of the MFP 200, is indicated in the transmission source display field 711a, and "Document01.pdf" described above is indicated in the attached file display field 711c.

In the calculation result display field 712, the contents of the setting values for the print settings in the setting fields 651, 652, 653 of the aforementioned portal page 650, that is, the number of copies "1," the sheet size "A4," and the color setting "color" are indicated. Although not shown in the drawings, the print setting values in the paper type setting filed, the print quality setting filed, the border setting filed and the like, as described above, are also indicated. Further, the amount of payment calculated in S76 above is indicated as "180 yen" in this example. When describing the contents of the reply email, each of the display fields such as 711, 712, and the like, included in the email reception screen 710 may be referred to as simply a "display field of reply email," and the like, as appropriate.

In the payment URL display field 713, the contents of the above Payment URL, that is, in this example, the URL "https://hogehoge.payment.html" and the text "Proceed to Payment" are displayed.

In the example shown in FIG. 6, the payment amount calculated in S76 and the Payment URL, above, were directly described in the body of the reply email, but the configuration is not limited to the example shown in FIG. 6. For example, although not shown in the drawings, at least one of the payment amount and the Payment URL mentioned above may be described in the subject line of the reply email. Alternatively, at least one of them may be listed in the "CC" or "BCC" field, or at least one of them may be described in an access destination web page, or the like listed in the "CC" or "BCC" field.

When Payment is Made Without Changing Print Settings

When the user checks the email reception screen 710 and does not change the print setting values as described below, the user clicks "https://hogehoge.payment.html" in the payment URL display field 713 by appropriate operation on the mobile terminal 300. Then, in the mobile terminal 300, S92 after S85 above is determined to be Yes, and accordingly, a payment request is transmitted from the mobile terminal 300, which is received by the data processing server 100 (S102). In response to this, the data processing server 100 executes a payment re-reservation process in S99. That is, since the user's approval for the first amount above has been made, a process similar to the process for the first amount in S79 above is performed again. In other words, the aforementioned product ID, the aforementioned authentication information, the aforementioned first amount calculated in S76, and the Confirm URL for confirming the completion of payment are transmitted to the transaction server 400, and the first Payment URL, and the transaction ID are received by the data processing server 100.

After S99 above, in the data processing server 100, the display data of the payment portal page corresponding to the payment request received in S102 is output to the mobile terminal 300, thereby the payment portal page is displayed on the mobile terminal 300 (S103). An example of this payment portal page according to this modified embodiment is shown in FIG. 7A.

Figure 7A:
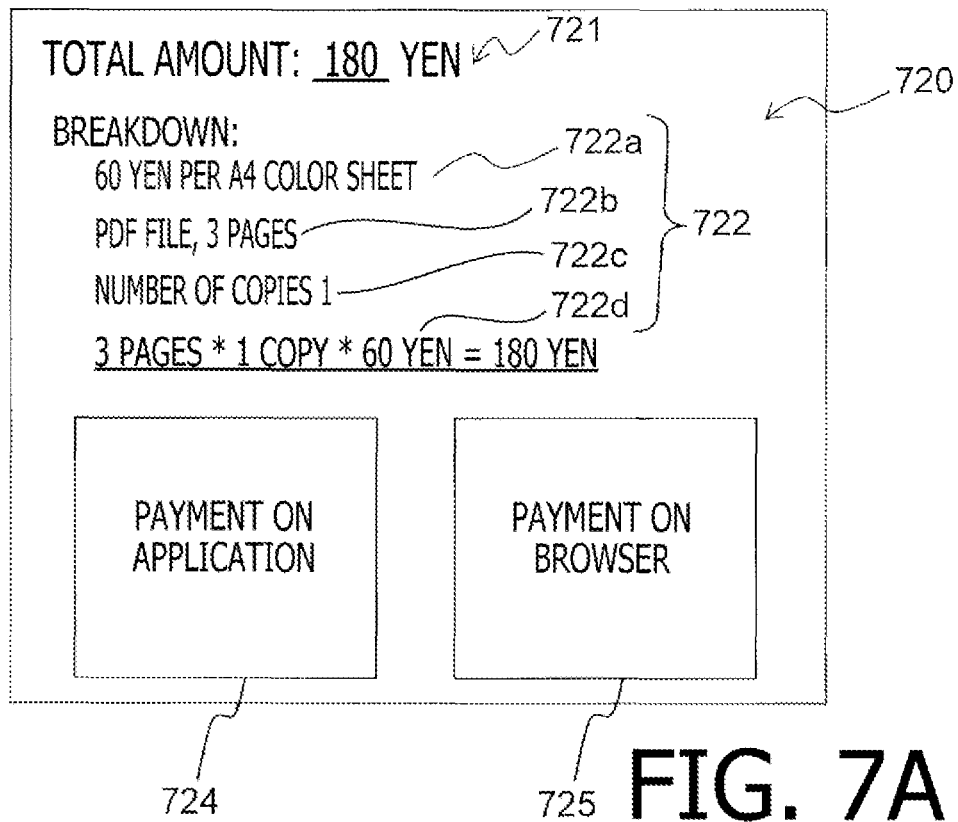
FIGS. 7A and 7B are an example of a payment portal page and an example of a setting change portal page displayed on the mobile terminal.

In FIG. 7A, this payment portal page 720 has a payment amount display field 721, a payment breakdown display field 722, a payment button 724 for the application, and a payment button 725 for the browser. The payment portal page 720 is an example of a payment page.

The payment amount display field 721 shows "180 yen" in this example, in line with the previous example. The payment breakdown display field 722 includes a unit price display field 722a, a file format and the number of pages display field 722b, the number of copies display field 722c, and a calculation formula display field 722d.

In the unit price display field 722a, "60 yen per A4 color sheet" is displayed, corresponding to the unit price of 60 yen for an A4 size sheet of color printing in this example. In the file format and the number of pages display field 722b, "pdf file, 3 pages" is displayed, corresponding to the aforementioned content. In the number of copies display field 722c, "Number of copies 1" is displayed, corresponding to the fact that the number of copies is one. In the formula display field 722d, the formula used when the fee is calculated in response to the above unit price display field 722a, file format/the number of pages display field 722b, and the number of copies display field 722c is displayed as "3 pages*1 copy*60 yen=180 yen" in accordance with the above example.

The payment button 724 for the application is a button for executing online payment on the payment application program associated with the transaction server 400 described above. The browser payment button 725 is a button for executing online payment on a normal browser, not on the payment application program associated with the transaction server 400 described above.

Based on the contents displayed on the above payment portal page 720, the user can know the fee he/she should pay for the use of the service this time. When the user clicks the payment button 724 for the application with appropriate operation on the mobile terminal 300, as shown in FIG. 8 following FIG. 5, a payment approval instruction is given by the user who confirms the contents of the payment amount display field 721 and the payment breakdown display field 722 as described above (S91). As a result, a payment approval notification is transmitted from the mobile terminal 300 to the transaction server 400 on the payment application described above (S105). When the payment button 725 for the browser is clicked, the same as above, a payment approval notification is transmitted from the mobile terminal 300 to the transaction server 400 on the browser (S105).

When Print Settings are Changed as Desired

As a feature of the present embodiment, the print setting values can be changed for each of the print files that are to be printed, according to the user's desire. Furthermore, in the present embodiment, unlike a modified embodiment (1-1) described below, all print setting values that are set in each print file can be changed as desired by the user. That is, in FIG. 6 described above, the email reception screen 710 is further provided with a print setting change URL field 714 in which the third URL is to be described, and in this example, a URL "https://hogehoge.setting.html" is indicated. If the user wishes to change the print settings after checking the contents of the transmitted email display field 711 and the calculation result display field 712, the user clicks on "https://hogehoge.setting.html" in the print setting change URL display field 714. Then, the mobile terminal 300 makes a No decision in S92 after S85, and a Yes decision in S93, and then, a request to obtain the portal page for changing settings is transmitted from the mobile terminal 300 accordingly and received by the data processing server 100 (S94). The data processing server 100 outputs the display data of the portal page corresponding to the request to obtain the portal page for changing the settings to the mobile terminal 300, and the portal page for changing the settings is displayed on the mobile terminal 300 to display the portal page for changing settings (S95).

Figure 7B:
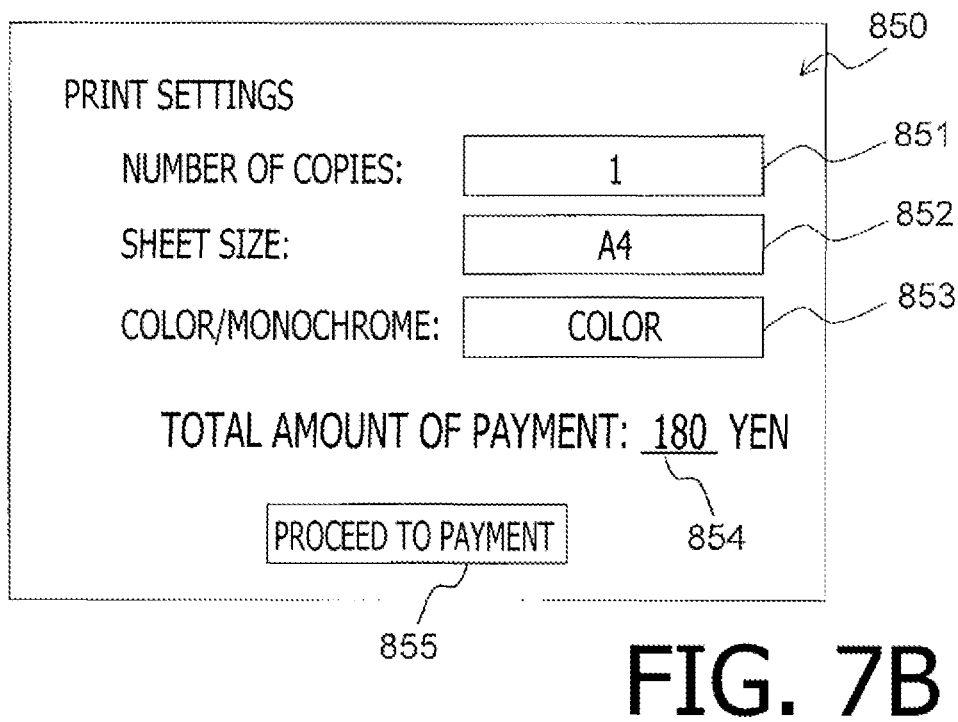

FIG. 7B shows an example of a setting change portal page 850, which is displayed on the mobile terminal 300. This setting change portal page 850, similar to the screen shown in FIG. 3, is provided with, as fields for reconfiguring the above print settings, the number of copies setting field 851 for entering the number of copies to be printed, a paper size setting field 852 for selecting the paper size, and a print color setting field 853 for selecting the print color setting (i.e., the color printing or the monochrome printing). As in the previous description, although not shown in the drawings, there are other fields such as the paper type setting field, the print quality setting field, the border setting field and the like, in addition to the above. In the example shown in FIG. 7B, the state before the user changes the settings is shown, and similar to the previous example, "1" copy is set in the number of copies setting field 851, "A4" size is set in the paper size setting field 852, and "color" is set in the print color setting field 853. Similar to the previous description, the contents of these settings in the respective setting fields 851, 852, and 853 are examples of the print setting values. Further, the setting change portal page 850 is an example of a print setting value change page.

Furthermore, in this setting change portal page 850, an amount display field 854 is provided to indicate the amount of the fee corresponding to the contents of the setting fields 851, 852 and 853. In the state before the change, shown in FIG. 7B, "180 yen" is displayed, which has already been calculated in S76 corresponding to the above-mentioned setting values of 1 copy, A4 size, and color.

In this state, if the user changes the contents of at least one of the setting fields 851, 852 or 853 by operating the mobile terminal 300, an instruction to change the print setting values is given (S96), and a reflection request to reflect the change in the print setting values is transmitted from the mobile terminal 300. The transmitted reflection request is received by the data processing server 100 (S97). Thereafter, in the data processing server 100, the print settings are changed in response to the receipt of the reflection request to change the setting value, i.e., the print setting value is updated (S89). It should be noted that the process performed in S89 is an example of the first print setting value changing process, and the process performed in S89 by the processor 110 of the data processing server 100 is an example of the setting value changing process according to the present embodiment.

Thereafter, the fee at the time of printing corresponding to the above setting value change is recalculated using the same method as is performed in S76 (S98). In other words, the fee is calculated by reflecting the change in print setting values in S89 to the first amount calculated in S76. The fee calculation in S98 is performed every time when a setting reflection request is received in S97 and the print setting value is changed in S89, i.e., in real time. It is noted that the amount is an example of a second amount and is hereinafter referred to simply as the "second amount." Further, the process performed in S98 is an example of a second fee determining process. Furthermore, the processes S76 and S98 performed by the processor 110 of the data processing server 100 are examples of the fee determining process according to the present embodiment. Thereafter, the display data of the portal page reflecting the results of the setting value change and the fee recalculation described above is output to the mobile terminal 300. In this way, in the mobile terminal 300, the portal page after the change of the print setting values is reflected is displayed (S100). Thereafter, the print setting values changed in S89 are transmitted to the MFP 200, and the print setting values are set to the MFP 200 (S90).

FIG. 9A shows an example of the setting change portal page 850, when the content of the sheet size setting field 852 is changed, for example, from a state shown in FIG. 7B to "A3" size. In this case, due to the change of the sheet size, the indication in the amount display field 854 has been changed from "180 yen" as described above to "360 yen."

FIG. 9B shows an example of the setting change portal page 850, when the content of the print color setting field 853 is changed, for example, from a state shown in FIG. 7B to "monochrome." In this case, due to change of the print color setting, the indication in the amount display field 854 has been changed from "180 yen" as described above to "90 yen."

In the setting change portal page 850, shown in FIG. 9A or FIG. 9B, a "Proceed to Payment" button 855 is provided on the page 850 for changing the settings reflecting the changed contents. When the user operates the "Proceed to Payment" button 855, the mobile terminal 300 makes a "Yes" determination in S101 after S100. In response, a payment request from the mobile terminal 300 is received by the data processing server 100 (S102), and the payment rescheduling process is executed in S99. That is, since the user's approval has been given for the second amount, the process similar to the process in S79 is performed again for the second amount. In other words, the product ID, the authentication information, the second amount calculated in S98, and the Confirm URL for confirming the completion of payment are transmitted to the transaction server 400, and the first payment URL and the transaction ID are received by the data processing server 100.

Thereafter, the data processing server 100 outputs the display data of the payment portal page corresponding to the payment request received in S102 to the mobile terminal 300, and the payment portal page is displayed on the mobile terminal 300 (S103). A final confirmation by a user is made to the payment portal page regarding payment of the fee after changing the print setting values as described above. Similar to the previous description, when the user clicks the payment button 724 for the application or the payment button 725 for the browser, the payment approval instruction described with reference to FIG. 8 is made (S91), and a payment approval notification is transmitted from the mobile terminal 300, which is received by the transaction server 400 (S105). The process performed in S105 by the transaction server 400 is an example of a payment approval receiving process according to the present embodiment.

If the "Proceed to Payment" button 855 is not operated on the setting change portal page 850 shown in FIG. 7B, the determination in S101 is "No," the process returns to S93, and the aforementioned process is repeated.

After S105, the transaction server 400 that received the approval notification transmits the Confirm URL corresponding to the Payment URL at the time of scheduling the payment (S79) to the mobile terminal 300 (S107). Based on the Confirm URL, the mobile terminal 300 transmits a payment completion request, which is received by the data processing server 100 (S109). As a result, the data processing server 100 makes a "Yes" determination for S111 and performs a payment completion confirmation process (S113). That is, the authentication information, the product ID, and the transaction ID corresponding to the Confirm URL are transmitted to the transaction server 400. Additionally, a return code transmitted from the transaction server 400 in response to the above transmission is received by the data processing server 100.

After the payment completion confirmation process, the data processing server 100 transmits a payment completion notification (S115), which is received by the mobile terminal 300 (S117). Then, the data processing server 100 performs a particular conversion on the image data contained in the print file attached to the email received in S41, and generates print data in a form that reflects the print settings changed in S89 (S120). The processor 110 of the data processing server 100 that executes S120 is an example of a first data generator. Thereafter, the print data based on the print file received in S41 is transmitted from the data processing server 100 (S125), which is received by the MFP 200 (S126). The above print data may be data of the print file itself or rasterized data for printing. The process executed in S125 is an example of a first information transmitting process. Further, the process executed in S126 is an example of a data obtaining process, and the process performed in S126 by the processor 210 is an example of a data obtaining process according to the present application.

The method is not limited to a method to transmit print data directly from data processing server 100 to the MFP 200, as in the process in S125 and S126 above, but other methods may also be used. That is, for example, in response to the data processing server 100 receiving a payment completion confirmation notification from the transaction server 400, the data processing server 100 may store the print data in an appropriate external device connected to the network NT. In such a case, the data processing server 100 transmits a data obtaining instruction including access information such as the URL of the above-mentioned external device to the MFP 200 afterwards. The MFP 200 receives the transmitted data obtaining instruction. Upon receipt of the data obtaining instruction, the MFP 200 accesses the external device via the network NT to obtain the print data from the external device. In this case, the access information is an example of storage destination information. Further, the process by which the data processing server 100 transmits the data obtaining instructions is another example of the first information transmitting process. Furthermore, the process by which the MFP 200 obtains print data from the external device is another example of the data obtaining process.

Thereafter, in the MFP 200, the print engine 290 prints the image data corresponding to the print data received in S126 on the paper (S127). Further, in that case, printing is performed based on the print setting values in each of the setting fields 651, 652, 653, and the like of the print setting portal page 650 received in S33, or the print setting values after being changed in S89. The process executed in S127 is an example of the first printing process. Thereafter, this sequence flow is terminated.

Effects of the Embodiment

As described above, in the print system 1 according to the present embodiment, the print data is obtained by the MFP 200 in S126 of FIG. 8, and the image corresponding to the print data is formed on the paper by the print engine 290. The fee charged for forming an image on a sheet is determined by the data processing server 100 in S76 and S98. The print engine 290 forms the image on the paper based on the print setting values, which can be changed by the data processing server 100 in S89. When the print setting values are changed, the print engine 290 forms an image on the paper based on the changed print setting values (S127). As described above, according to the present embodiment, the print setting values are configured to be changeable (S89), which allows the user to change the print settings that have been determined in advance as desired.

Further, especially in the present embodiment, the print setting values can be changed for each print file in S89 executed by the data processing server 100. Therefore, unlike the case where, for example, the print setting values for all image formation on the MFP 200 are changed all at once, each user's intentions and preferences can be individually reflected in the printed material.

Further, especially in the present embodiment, when the print setting values are changed in S89 by the data processing server 100, the print data reflecting the changes is generated in S120. Concretely, after the print setting values are changed in S89 and the corresponding second amount is determined in S98, if the transaction server 400 receives approval for payment of the second amount in S105, the data processing server 100 generates the print data in S120. By waiting for approval from the user for a change in fees associated with a change in print setting values before generating print data, unnecessary data generation before the change in print setting values has been confirmed can be avoided.

Further, especially in the present embodiment, each time the print setting values are changed in S89 by the data processing server 100, the second amount corresponding to the change is determined in S98. In this way, the price can be determined in real time in response to changes in print settings, and the amount to be charged at the current setting can be clearly indicated to the user.

Further, especially in the present embodiment, a so-called email printing is performed. That is, an email transmitted from the mobile terminal 300 attached with a print file to be printed is received by the data processing server 100 in S41. This first email contains the print setting values related to the print settings of the print file. When the first email is received, the first amount for forming an image based on the attached print file is determined in S76. An email in which the determined first amount and a second Payment URL of the payment page for paying the first amount is indicated is transmitted by the data processing server 100 to the mobile terminal 300 in S83. In the email at this time, a third URL of a page for changing print setting values is indicated, which allows the user to change the print setting values of the print file. In this way, the user can access the third URL indicated in the email received by the mobile terminal 300, which allows the data processing server 100 to change the print setting values of the aforementioned print file in S89. As this change in print setting values is reflected, the first amount is changed to the second amount in S98. The user can pay the second amount after the above change through electronic payment by accessing the second Payment URL indicated in the aforementioned email using the mobile terminal 300 (S102-S117). When the above payment of the second amount is completed, print data based on the above print file or storage location information of the print data is transmitted to the MFP 200 (S125), and in S127, image formation is performed by applying the changed print setting values to the print data. As described above, according to the present embodiment, the user can change the print setting values that have been determined in advance as desired, and execute the email print according to the changed print setting values. In this case, the URL in the email can be used to access the page for changing the print setting values (S95, S96), so the print setting values can be changed easily and quickly without any extra effort.

Modification

The first embodiment is not limited to the above-mentioned form, and various modifications are possible within the scope of not departing from the object and technical concept of the embodiment. Such modifications are described below in order of precedence. Portions equivalent to those in the first embodiment above are marked with the same symbols, and explanations thereof are omitted or simplified as appropriate.

(1-1) When a Difference in Data Generation Timing is Provided

When generating print data in a form that reflects the print setting values changed in S120 of FIG. 8, as mentioned above, it is necessary to perform a particular conversion on the image data contained in the print file. This conversion includes multiple stages of processes that differ from each other, and the process also differs depending on what data format the original image data is in. The present modification corresponds to the above, and, among the multiple processes, the execution timing of the processes for which execution time is long and the processes for which execution time is relatively short are differentiated.

In this modification, a control procedure representing the processes executed by the processor 210 of the MFP 200, the processor 110 of the data processing server 100, the processor of the transaction server 400, and the processor of the mobile terminal 300 is described referring to FIG. 2, FIG. 10, which corresponds to FIG. 5, and FIG. 12, which corresponds to FIG. 8.

Also in this modification, each of the processes shown in S11 to S41 in FIG. 2 is first executed. Thereafter, the process moves to FIG. 10, where S76, S79, S81, S83, and S85, similar to those in FIG. 5, are executed. In the data processing server 100, after S83, part of the print data is generated in a newly provided S120A. That is, the print data is generated by performing a prescribed conversion on the image data contained in the print file attached to the email received in S41 described above. In this example, in S120A, the print data is generated only for items for which the time required for the conversion process described above is relatively long. Concretely, in this example, among the number of copies, the paper size, the print color setting, the paper type, the print quality, and the bordering described above referring to FIG. 3, the print data is generated by performing conversion processing corresponding to the setting values received in S33 for the number of copies, the paper size, the print color setting, and the bordering.

In response to the above, in S95, which is performed in response to receiving a request to obtain a setting change portal page in S94, only the paper type and print quality are displayed on the mobile terminal 300 as print setting values that can be changed, excluding the number of copies, the paper size, the print color setting, the paper type, the print quality, and the bordering, all of which are described above referring to FIG. 3, and excluding the number of copies, the paper size, the print color setting, and the bordering, for which print data has already been generated. In the present modification, an example of a portal page for changing the setting values displayed by the mobile terminal 300 in S95 is shown in FIG. 11A, corresponding to FIG. 7B, when the display data of the relevant portal page corresponding to the above request for obtaining a portal page for changing the settings is output from the data processing server 100.

In FIG. 11A, the setting change portal page 850 has fields for making the above print settings again, including a print quality setting field 856 for selecting "normal" or "high quality" print quality mode, and a paper type setting field 857 for selecting a plain or a glossy paper. The example shown in FIG. 11A shows the state before any changes are made by the user, with "normal" mode selected in the print quality setting field 856 and "plain sheet" selected in the paper type setting field 857. Similar to the previous description, the setting content in each of the setting fields 856, 857 is an example of the print setting values. Further, the setting change portal page 850 is an example of a page for changing print setting values.

In this setting change portal page 850, an amount display field 854 is provided to indicate the amount of the fee corresponding to the contents of the setting fields 856 and 857, as described above. In the state before the change shown in FIG. 11A, "250 yen" is displayed, which has been calculated in S76 corresponding to the setting values of "normal mode" and "plain sheet."

In this state, if the user changes the contents of at least one of the above setting fields 856 and 857 by appropriate operations on the mobile terminal 300, as described above, it is regarded that the user instructs to change the print setting values (S96), and a request to reflect the change in the setting values is sent from the mobile terminal 300 and is received by the data processing server 100 (S97). Thereafter, in the data processing server 100, the print settings are changed in response to the receipt of the request to reflect the change in the setting values, i.e., the print setting values are updated (S89). The process performed in S89 is an example of a first print setting value changing process, and the process that executed in S89 is an example of a setting value changing process in the present modification.

Other than the above, that is, in S92, S93, S94, S96, S97, S89, S98, and S100, processes similar to those in FIG. 5 are performed. In data processing server 100, after performing the processes S98 and S100, a newly provided S120B is performed. That is, the remaining items for which print data was not generated in S120A, in this case items for which the time required for the aforementioned conversion process is relatively short, are the only items for which print data is generated, or re-generated, in S120B, reflecting the changes to the print settings made in S89. Concretely, in this example, among the number of copies, the paper size, the print color setting, the paper type, the print quality, and the border as described with reference to FIG. 3, the conversion process is performed on the setting values received in S33 for the paper type and print quality, and corresponding to the changes made in S89, to generate print data. It is noted that the processes that are executed in S120B and the aforementioned S120A are examples of a third data generating process.

After S90, in each of the processes shown in FIG. 10, the same processes as in FIG. 5 above are performed, and then, in FIG. 12, S91 to S117, similar to those in FIG. 8, are performed. In this modification, S120 shown in FIG. 8 is omitted for the data processing server 100, and S125 is executed after S115. The rest of the process is the same as in FIG. 5, and the description is omitted.

Effects of Modification

In the present modification configured as described above, the same effects as in the first embodiment are obtained.

Further, especially in this modification, the print data is generated in S120A in accordance with the pre-set contents, i.e., the contents set before the print setting values are changed by the data processing server 100 in S89. As print setting values, a distinction is made in advance between a first print setting value, which requires a relatively long time to generate print data, and a second print setting value, which requires a relatively short time to generate print data. When the print setting values are changed, different processes are performed depending on whether the print setting is the first or second print setting value.

That is, the data processing server 100 only receives changes to the second print setting value among the first and second print setting values (S93). When the change of the second print setting values is received and the second print setting values are changed by the data processing server 100 in S89, the aforementioned print data is replaced with new print data reflecting the change in S120B each time the change is made. In this way, the print data can be generated in real time in response to changes in the print setting values.

On the other hand, the data processing server 100 does not receive the change of the first print setting values for the print data that has already been generated in S120A, and thus the first print setting values are not changed in S89. Therefore, the print data corresponding to the initial first print setting values generated in S120A are maintained. By not receiving changes to the first print setting values, which take time to generate the print data, and receiving changes only to the second print setting values, which do not take time to generate the print data, it is possible to avoid wasting a long time needlessly.

(1-2) When Print Settings are Changed by MFP Via EWS Access

In the first embodiment and the modification (1-1) described above, the print setting values were changed by accessing the third URL indicated in the reply email transmitted to the mobile terminal 300 in S83, but the configuration is not limited to the above. In this modification, the print setting values are changed by accessing, from the mobile terminal 300, a web page displayed based on the display data in the so-called EWS (Embedded Web Server) file format that is prepared in advance for the MFP 200.

In this modification, a control procedure representing the processes performed by the processor 210 of the MFP 200, the processor 110 of the data processing server 100, the processor of the transaction server 400, and the processor of the mobile terminal 300 is described with reference to FIG. 2, FIG. 13 corresponding to FIGS. 5 and 10, and FIG. 8.

In this modification, each of the processes shown in S11-S41 in FIG. 2 is first performed. Thereafter, the process moves to FIG. 13, where S76 similar to that in FIG. 5 is executed, followed by S120', which corresponds to S120 described above. That is, the print data is generated by applying a particular conversion to the image data contained in the print file attached to the email received in S41. Thereafter, in the data processing server 100, S79 similar to that in FIG. 5 is executed, and then S81' corresponding to S81 is executed. In S81', a reply mail is generated as in S81. However, in the reply email that is generated, the payment amount that is the result of the calculation in S76 and the second Payment URL obtained in S79 will be described, but the third URL as is mentioned in S81 will not be described. This reply email is an example of the second email in this modification, and the process performed in S81' is an example of the email generating process in the present modification. The reply email generated in S81' is transmitted to the mobile terminal 300 (S83) as a reply to the email received in S41, similarly to the first embodiment, and is received by the mobile terminal 300 (S85). The process performed in S83 is also an example of an email replying process in this modification. When the received reply email is opened, an email reception screen similar to the aforementioned email reception screen 710 is displayed on the mobile terminal 300, but the URL display field 714 for changing print settings including the third URL is not provided.

In this modification, when the user wants to change the print setting values, the user performs an appropriate operation on the mobile terminal 300 (S295) to access a particular URL corresponding to the EWS, and the MFP 200 outputs the display data in the file format for the EWS. FIG. 14 shows an example of a Web service page 550 that is displayed in the browser of mobile terminal 300 in response to the output of this display data.

FIG. 14 shows the web service page 550 which is provided with a "Web Service ON" button 551. When the user performs an appropriate operation on the mobile terminal 300 or the like to display the Web service page 550 and operates the "Web service ON" button 551, a print setting page 560 shown in FIG. 15 is displayed, for example (S11).

In other words, in the print setting page 560 shown in FIG. 15, there are medium items such as "Printing" and "Papers" in the main item of "Print Settings."

Under the item "Printing," there are further items such as "Numbers," "Color," and "Quality." In each item, the desired print setting values can be set by appropriate operations by the user on the mobile terminal 300, and the set contents are displayed after the settings are made (not shown). For example, in the item "Numbers," the number of copies as described above using FIG. 3, FIGS. 11A, 11B, and the like is set, in the item "Color," whether the color setting for printing is monochrome or color is set, and in the item "Quality," "normal mode" or "high quality mode" is set for the printing quality as described above. Similarly, under the item "Papers," there are further items such as "PaperTypes" and "Size." In the item "PaperTypes," whether the paper type is "plain paper" or "glossy paper" is set, and in the item "Size," the paper size such as A4, A3, A5, B4, B5, . . . is set. Although not shown in the drawings, the presence or absence of the border can also be set on this print setting page 560.

In this modification, as in the first embodiment described above, the print setting values can be changed for each of the above print files that are to be printed, according to the user's wishes. When the user wishes to change the print setting values, he/she sets the contents of the print setting values he/she wishes to change by performing a new input operation on the print setting page 560 of the EWS shown in FIG. 15 (S295). Then, the determination in S93 is "Yes" in the mobile terminal 300, and accordingly, a print setting change instruction is transmitted from the mobile terminal 300 that is in the state of accessing EWS, which is received by the MFP 200 (S296).

Thereafter, in the MFP 200, the print settings are changed in response to the print setting change instruction, i.e., the print setting values are updated (S289), as in S89 which is performed, as described above, in the data processing server 100. The process performed in S289 is an example of the second print setting value changing process, and the process performed S289 by the processor 110 of the data processing server 100 is an example of the setting value changing process in this modification. The contents of the print setting values changed in S289 are then transmitted from the MFP 200 and received by the data processing server 100 (S297).

Thereafter, in the data processing server 100, the fee for printing corresponding to the change of the print setting values is recalculated in the same manner as in S76 (S98). In other words, the fee is calculated such that the change in the print setting values in S289 is reflected in the first amount calculated in S76. In this modification, the fee calculation in S98 is performed in real time each time a setting change instruction is received in S296 and the print setting values are changed in S289. This amount is an example of the third amount and is hereinafter referred to simply as the "third amount." Further, the process executed in S98 in this modification is an example of the third fee determining process. Furthermore, also in this modification, the processes performed in S76 and S98 by the processor 110 of the data processing server 100 are examples of the fee determining process according to this modification.

After processing S98, a newly provided S120" is executed in the data processing server 100. In S120", if the print settings have been changed in S289, the print data is generated in a way that reflects the changes, that is, a so-called re-generation of the print data is performed. Concretely, in this example, the print data is generated by executing the conversion process corresponding to the changes of the print setting values received in S297 on the print data having been generated in S120'. It is noted that the processes performed in S120" and above-described S120' by the data processing server 100 are examples of the second data generating process according to the present application. Thereafter, in a newly provided S121, the result of the fee recalculation in S98 is transmitted from the data processing server 100 and received by the MFP 200.

In the subsequent steps of S101, S102, S99, and S103 in FIG. 13, the same processes as in FIG. 5 and FIG. 10 are performed. After the process in FIG. 13, the process moves to FIG. 12, where each of the processes S91-S127 is performed. In this case, the process executed by processor 110 of data processing server 100 in S125 is an example of the second information transmitting process. The process performed in S126 by the processor 210 of the MFP 200 is an example of the data acquisition process, the process performed in S126 by the processor 210 in this modification is an example of the data obtaining process, and the process performed in S127 by the processor 210 is an example of the second printing process.

Effects of Modifications

In the present modification configured as described above, the same effects as in the first embodiment are obtained.

Further, especially in the present modification, the following effects are obtained. In the present modification, as in the previous modification, an email attached with a print file transmitted from the mobile terminal 300 is received by the data processing server 100 in S41. The email contains print setting values related to the print settings of the print file. When the first amount to be charged for the print file is determined in S76, an email containing the first amount and the second URL for paying the amount is transmitted by the mobile terminal 300 in S83.

When the user who confirms the email using the mobile terminal 300 accesses the print setting page 560 for the EWS using a particular URL and enters the change of print setting values on the print setting page 560, in response, the print setting values of the print file are changed by the MFP 200 in S289. As this change in print setting values is reflected, the first amount is changed to the third amount by the data processing server in S98. By accessing the second URL in the email received by the mobile terminal 300, the user can make payment of the third amount after the aforementioned change through electronic payment (S102-S117). When the payment of the third amount is completed, similar to the above processes, the print data based on the print file or the storage destination information of the print data is transmitted to the MFP 200, and in S127, image formation is performed by applying the changed print setting values to the print data.

As described above, this modification allows the user to change the print settings determined in advance to suit his or her needs, and then execute the email printing according to the changed print settings. In that case, by changing the print setting values by the input on the print setting page 560 for the EWS, the change of the print setting values by a malicious third party impersonation can be suppressed compared to the case where users access the payment portal page using the second payment URL in the email and make changes as in the first embodiment and the modification (1-1) above.

Further, especially in this modification, the print data is generated by the data processing server 100 at S120' with the contents before the print setting values are changed by the MFP 200 in S289, i.e., with the contents set in advance. Whenever the print setting values are changed, new print data reflecting the change is generated in S120", and the new print data replaces the previous print data. In this way, the print data can be generated in real time in response to changes in the print setting values.

In the present modification, in particular, each time the print setting values are changed by the MFP 200 in S289, the third amount corresponding to the change is determined in S98. In this way, the fees can be determined in real time in response to changes in print setting values, and the amount to be charged at the current setting value can be clearly indicated to the user.

(1-3) When Print Settings are Changed by Operating Touchscreen panel of MFP In this modification, instead of changing the print setting values in the Web page for the EWS in the above modification (1-2), the print settings are changed by operation on the operation panel 250. In this example, in particular, the operation panel 250 is configured as a touchscreen panel that also serves as the display 240. Hereinafter, both are collectively referred to as a "touchscreen panel 240" as appropriate.

In this modification, the control procedures representing the processes executed by the processor 210 of the MFP 200, the processor 110 of the data processing server 100, the processor of the transaction server 400, and the processor of the mobile terminal 300 are described with reference to FIG. 2, FIG. 16 corresponding to FIG. 13, and FIG. 8.

In this modification, each of the steps S11-S41 shown in FIG. 2 is first executed. Then, the process moves to FIG. 16, where S76, S120', S79, S81', S83, and S85, similar to those in FIG. 13 above, are executed.

In the present modification, when the user wishes to change the print setting values, the user performs the appropriate operation on the touchscreen panel 240 of MFP 200 (S395) to make the desired change in the print setting values. The operation of the touchscreen panel 240 at this time is described with reference to FIGS. 17A-17C.

First, in the initial screen 240A displayed on the touchscreen panel 240, icons representing each operation menu such as "Fax," "Copy," and "Scan" and the like are displayed, as shown in FIG. 17A. As the user operates the "Setting Menu" icon, among the icons, a various-item setting screen 240B shown in FIG. 17B are displayed.

The various-item setting screen 240B displays buttons for "Maintenance," "Wifi (registered trademark of Wi-Fi Alliance)," "Quiet Mode," "Tray Setting," "Fax Preview," and "All Settings" as buttons indicating items for which settings can be made. By operating the "All Setting" button on the screen, and then performing an appropriate operation on a not-shown screen, a detailed setting screen 240C provided with "Printing," "Papers," and other intermediate items, as shown in FIG. 17C, will be displayed.

In the detailed setting screen 240C, buttons "Numbers," "Color," and "Quality" are provided under the item "Printing" as small items for detailed setting, and desired print setting values can be set by operating each button appropriately (not shown). For example, the "Numbers" button can be used to set the number of copies, the "Color" button can be used to set whether the printing color setting is monochrome or color, and the "Quality" button can be used to set the "normal mode" or "high quality mode" for the print quality. Similarly, under the "Papers" item, there are "PaperTypes" and "Size" buttons for detailed settings. The "PaperTypes" button can be used to set the paper type, and "Size" button can be used to set the paper size such as A4, A3, A5, B4, B5, . . . , and the like. Although not shown in the drawings, the presence or absence of the border can also be set using a not-shown button.

In the present modification, as in the first embodiment, the print setting value can be changed for each of the above print files to be printed, according to the user's wishes. When the user wants to change the print setting values, he/she sets new print setting values by inputting the contents of the print setting values to be changed using the buttons on the detailed setting screen 240C of the touchscreen panel 240 shown in FIG. 17C (S395). In response, in the MFP 200, the print settings are changed in the same way as in S89, which is performed in the data processing server 100, i.e., the print setting values are updated (S289) corresponding to the changes in the print settings described above. The process performed in S289 is an example of the third print setting value changing process, and the process performed in S289 by the processor 110 of the data processing server 100 in this modification is an example of a setting value changing process. The contents of the print setting values changed in S289 are then transmitted from the MFP 200 and received by the data processing server 100 (S297).

Thereafter, in the data processing server 100, the fee for printing corresponding to the above change in print setting values is recalculated in the same manner as described above (S98). In other words, the fee is calculated by reflecting the change in print setting values in S289 on the first amount calculated in S76. In this modification, the fee calculation in S98 is performed every time a setting change operation is made via the touchscreen panel 240 in S395 and the print setting is changed in S289, in other words, in real time. This amount is an example of the fourth amount. Further, the process performed in this S98 in this modification is an example of a fourth fee determining process. Further, in this modification, the processes performed in S76 and S98 by the processor 110 of the data processing server 100 are examples of a fee determining process according to the present application.

After S98, in S120", the same as above, the conversion process corresponding to the changes in the print setting values received in S297 based on the operation on the touchscreen panel 240 is executed on the print data generated in S120', and the print data is generated. It is noted that the processes performed in S120" and the S120' by the data processing server 100 are examples of the second data generating process according to the present application.

The subsequent processes are the same as in the aforementioned modification (1-2), and a detailed description thereof is omitted. In this modification, the process performed by the processor 110 of the data processing server 100 in S125 is an example of the third information transmitting process. Further, in this modification, the process performed in S126 by the processor 210 of the MFP 200 is an example of the data obtaining process, the process performed in S126 is an example of the data obtaining process, and the process performed in S127 is an example of the third printing process.

Effects of Modification

In the present modification configured as described above, the same effects as in the first embodiment are obtained.

Further, in the present modification, the following effects can be obtained. In the present modification, as in the above-described embodiment, an email attached with a print file from the mobile terminal 300 is received by data processing server 100 in S41, and this email contains print setting values related to the print settings of the print file. When the first amount to be charged for the print file is determined in S76, an email containing the first amount and the second URL for paying the amount is transmitted by the mobile terminal 300 in S83.

When the user who confirms the email using the mobile terminal 300 inputs a change in the print setting values using the aforementioned buttons on the detailed setting screen 240C of the touchscreen panel 240, the print setting values of the print file are changed by the MFP 200 in S289 in response to the input. As the change in print setting values is reflected, the first amount is changed to the fourth amount by the data processing server in S98. The user can pay the fourth amount after the above change through the electronic payment by accessing the second URL indicated in the email received by the mobile terminal 300 (S102-S117). When the payment of the fourth amount is completed, as described above, the print data based on the print file or the storage destination information of the print data is transmitted to the MFP 200, and in S127, image formation is performed by applying the changed print setting values to the print data.

As described above, according to the present modification, the user can change the print settings determined in advance to desired settings, and the email printing can be executed according to the changed print settings. In this case, by changing the print setting values by inputting the same on the detailed setting screen 240C on the touchscreen panel 240, it is possible to suppress the change of print setting values by a malicious third party's spoofing compared with a case where the change is made by accessing the portal page for the payment using the second Payment URL indicated in the email as in the first embodiment of the modification (1-1).

Further, in this modification, as in the above-described modification (1-2), the print data is generated in S120' with the contents set in advance. Each time when the print setting values are changed, new print data reflecting the changes is generated in S120", and the new print data replaces the aforementioned print data. In this way, the print data can be generated in real time in response to changes in the print setting values.

In the present modification, in particular, each time when the print setting values are changed by the MFP 200 in S289, the fourth amount corresponding to the change is determined in S98. In this way, it is possible to determine the fee in real time in response to changes in print setting values, and clearly indicate to the user the amount to be charged at the current setting values.

Hereinafter, a second embodiment of the present disclosures will be described with reference to FIGS. 18-29. As in the first embodiment above, the present embodiment is also configured such that a print service, in which the user (i.e., the customer) pays a fee to use the printing function of the MFP 200, is performed, and the user transmits a print file to be printed to the MFP 200 via a PC terminal connected to the network. The transmission of the file causes the MFP 200 to print the print file, and the process related to the payment of the printing fee is further carried out by so-called electronic payment as in the first embodiment described above. Parts equivalent to those in the first embodiment and the modifications are assigned with the same symbols, and descriptions thereof are abbreviated or simplified as appropriate.

Overview of Printing System

The printing system 1 according to the present embodiment is shown in FIG. 18 that corresponds to FIG. 1 for the first embodiment. The printing system 1 shown in FIG. 18 and according to the present embodiment includes the data processing server 100, the MFP 200, the mobile terminal 300, and the transaction server 400 as described above, and further a PC terminal 500. In the present embodiment, the PC terminal 500 is an example of an external device. The PC terminal 500 is connected to the network NT in the same way as the data processing server 100, the MFP 200, the mobile terminal 300, and the transaction server 400 are connected as described above. The data processing server 100, the MFP 200, the mobile terminal 300, the transaction server 400, and the PC terminal 500 are configured to communicate with each other.

The PC terminal 500 is installed in the user's office or home in this example, and is connected to the network NT via a wireless or wired communication. The PC terminal 500 has a processor, a storage device, a display device, an operation panel, and an interface for connecting to the network NT (not shown). Further, in the present embodiment, the volatile storage device 120 is provided with a job ID storage area 121 and a machine ID storage area 122. The respective storage contents will be described in detail later.

Process Flow

In the printing system 1 with the above configuration, a so-called PC printing is performed such that a print file transmitted from the PC terminal 500 is received by the MFP 200 and then transmitted to the data processing server 100. In the present embodiment, the above print file is transmitted and received as a print job that includes the image data to be printed and the print commands for printing the image data. Hereafter, the details of the above PC printing performed in the present embodiment will be explained in turn. In the present embodiment, the control procedures representing the processes executed by the processor 210 of MFP 200, the processor 110 of data processing server 100, the processor of the transaction server 400, the processor of the mobile terminal 300 will be described with reference to FIG. 19, FIG. 20, FIG. 23, and FIG. 25. As in the first embodiment, in the following description referring to FIGS. 20, 23 and 25, the description of respective processors will be omitted, that is, expressions "in the processor of the MFP 200," "by the processor of the MFP 200" and the like are expressed as "in the MFP 200," "by the MFP 200" and the like.

Print Settings and Fee Calculation

In FIG. 19, first, the user opens an appropriate print setting value input screen (not shown) by appropriately operating the operation panel of the PC terminal 500, and inputs the respective print setting values that the user wants to set individually for the print job including image data prepared in advance for printing (S501). With this configuration the PC terminal 500 obtains the print settings. For example, like the print setting portal page 650 displayed on the mobile terminal 300 in the first embodiment, this print setting value input screen includes, as fields for print settings, the number of copies setting field for inputting the number of copies to be printed, the paper size setting field for selecting the paper size, the print color setting field for selecting the print color setting (i.e., color or monochrome), the paper type setting field for selecting the paper type (i.e., plain paper or glossy paper, etc.), the print quality setting field for selecting "normal" or "high quality" mode, and the border setting field for selecting the printing with or without borders. Also in the present embodiment, the settings in all these setting fields are examples of print setting values, and as in the first embodiment, they are not limited to those expressed in numerical values, but also include setting factors that are expressed in non-numerical forms, such as kind and type, and can be selected or designated by the user.

The print settings input as described above are received by the PC terminal 500 (S502), then transmitted to the MFP 200, and received by the MFP 200 (S503). The process executed in S503 is an example of a print setting value obtaining process. The obtained print settings are further transmitted from the MFP 200 (S504) and received by the data processing server 100 (S505). The received print settings are stored in the print setting storage area 124. The process executed in S504 is an example of a print setting value transmitting process, and the process executed in S505 is an example of a print setting value receiving process.

Thereafter, in S543, the data processing server 100 calculates, based on the print settings for the print job received in S505 and stored in the print setting storage area 124, i.e., each print setting value, the fee to be charged to the user for printing the image data included in the print job. The process performed in S543 is an example of a fifth amount determining process, and the processor 110 of the data processing server 100 that performs S543 is an example of a fee determination unit in the present embodiment. In this calculation, for example, the fee is calculated based on the fee table stored in the fee table storage area 132 of the volatile storage device 120.

The result of the fee calculation in S543 above is transmitted from the data processing server 100 (S506) and obtained by the MFP 200 (S507). The process performed in S506 is an example of a fee transmitting process. The obtained fee calculation result is further transmitted from the MFP 200 and received by the PC terminal 500 (S508). Based on the received results, the PC terminal 500 displays the fees for executing the printing of the above printing job on the display device (S509).

If the user who has seen the fee displayed on the display device confirms the fee and determines that he/she may proceed to printing with the printing settings at that time, he/she may operate the operation panel of the PC terminal 500 to input an operation to the effect of "setting completion" (S510: Yes), which will lead to processing from S521 onward in FIG. 20 described later. The operation input of the "setting completion" is an example of a particular completion operation. If the user decides that he/she wishes to make print settings again instead of proceeding to print with the print settings at that point, the above S502 to S509 are repeated by performing the input of the print settings in S501 described above again, without inputting the above "setting completion" operation (S510: No). In this way, the print settings can be redone as many times as necessary until the user performs an operation input of the "setup completion." In that sense, in the present embodiment, the process performed in S502 by the processor of the PC terminal 500 is an example of a setting value changing process in the present embodiment.

Transmitting/Receiving of Print Job

When the user inputs the "setting completion" operation (S510: Yes), the process moves to FIG. 20, and through the appropriate operation of the operation panel of the PC terminal 500, the user instructs the PC terminal 500 to transmit the print job for which the print settings have been made (S521). At the same time, the user enters his/her user ID and a PIN code to secure the above print job on the PC terminal 500. This operation can be performed, for example, via a printer driver or an application installed on the PC terminal 500.

In response, the print job, the PIN code, and the user ID described above are transmitted from the PC terminal 500 (S523). The transmitted print job and other information are received by the MFP 200, thereby the MFP 200 obtaining the same (S524). After the print jobs are obtained in S524, they are sequentially started to be stored in the data storage area 222. The process performed in S524 is an example of a print job obtaining process.

The MFP 200 transmits the print job received in S524, together with the machine ID of the MFP 200 and the user ID received in S524 (S533). The process performed in S533 is an example of a first print job transmitting process.

The data processing server 100 receives (S535) the print job, the user ID, and the machine ID transmitted from the MFP 200 in S533. The process performed in S535 is an example of a first print job receiving process. Thereafter, in the data processing server 100, a JOB ID is generated (S540), and the print job received in S535 is associated with the generated JOB ID and the machine ID, which has already been received in S535, and stored in the data storage area 125 (S542). The process performed in S542 is an example of a print job storing process. The JOB ID is information to identify the job, in other words, to identify the image data.

Thereafter, in S544, the data processing server 100 issues a product ID for the execution of the service to print the print job received in S535. In other words, this product ID is generated individually for each print job.

Then, in S545, the print job, the corresponding machine ID, the product ID generated in S544, and the fee calculated in S543 are associated with each other. As a result, the print job, the JOB ID, and the machine ID are stored and registered in the data storage area 125 of the volatile storage device 120, the JOB ID storage area 121, and the machine ID storage area 122, respectively, in a manner associated with the fee and the product ID (S545). At this time, the print job, the JOB ID, and the machine ID are stored in a manner associated with the user ID received in S535.

Then, the data processing server 100 transmits, in S547, a registration completion notification indicating that the registration was completed in S545, which is received by the MFP 200 (S549).

The procedure from S521 to S549 is executed each time a print job is transmitted from the PC terminal 500 in S521. At that time, each time the print job is received in S535, the print job is stored and accumulated in the data storage area 125. Therefore, the number of the print jobs stored in data storage area 125 is not limited to one, but multiple print jobs may be stored in the data storage area 125. In other words, at least one print job is stored in the data storage area 125 in a manner associated with a corresponding JOB ID and a corresponding machine ID, respectively.

After S549, the MFP 200 stands by (S553) until the MFP 200 receives an instruction to display a registered job list, which will be described later. When the user operates the operation panel 250 of the MFP 200 appropriately in a state where at least one print job has been accumulated in the data storage area 125, if the user gives an instruction to display a list of print jobs already registered with the data processing server 100, the corresponding display instruction is received by the MFP 200 (S551). As a result, the determination in S553 is made Yes, and the registered job list request is transmitted from the MFP 200 to the data processing server 100 (S555).

When receiving the registered job list request, the data processing server 100 generates, in response, a list of at least one print job that has been accumulated and registered in the data storage area 125 (S557), based on the machine ID of a requesting MFP 200 as described above. The generated registered job list is transmitted in S559, and is received by the MFP 200 (S560).

After receiving the instruction to display a list of the print jobs, the MFP 200 displays an appropriate user ID input screen (not shown) on the display 240 in response to the receipt of the registered job list in S560. In the state where the user ID input screen is displayed on the display 240, when the user performs an appropriate operation on the operation panel 250 to input his/her own user ID (S561), the operation is received by the MFP 200.

Then, a registered job list containing only the print jobs corresponding to the user ID among the print jobs already registered with the data processing server 100 as described above is displayed on the display 140 (S563). In the following description, "input is made by operation through the operation panel 250" to the screen displayed on the display panel 240 as described above is simply referred to as "input is made to the screen" of the display panel 240. Similarly, "an operation, selection, or designation is made via the operation panel 250" on a button, a key, or a display shown on the display panel 240 is simply referred to as "a button or key is operated," "a button or key is clicked," or the content corresponding to the displayed name is "selected or designated" on the display panel 240.

An example of the registered job list displayed on the display 140 as described above is shown in FIG. 21. In FIG. 21, a registered job list display screen 242 is displayed on the display 140, and on the registered job list display screen 242, a message "The registered jobs are as follows. Please select a job to print" and identification information of multiple print jobs related to the user ID, in this example, the file names of the jobs, are displayed in the list. This print job identification information is an example of information about the print job. In the example shown in the FIG. 21, four print jobs with file names "document.U-eno.doc," "document.D-tec.doc," "document.B-S5tarS5.doc," and "document.A-Mpf.doc" are selectively displayed as candidates for printing. As mentioned above, for the image data of each of the four print jobs, the print settings are made for each print job in S501-S505 of FIG. 19.

In the state where the registered job list display screen 242 is displayed, when the user designates a desired print job by checking a checkbox next to the file name of the job (S565), the designation is received by the MFP 200 (S567). Although the user can designate one print job in S565, multiple print jobs may be designated.

When designation of one of the print jobs is made, the MFP 200 displays an appropriate PIN code entry screen (not shown) on the display 240. On the PIN code entry screen, the user re-enters the PIN code which was entered in S521 when the print job designated in S565 was transmitted (S569). Then, the PIN code is received by the MFP 200 (S571), the designation of the print job is established, and the details of the file information of the designated print job are displayed (S572).

An example of the file information for a print job displayed on the display 140 as described above is shown in FIG. 22. In FIG. 22, the file information display screen 244 is shown on the display 140, and in this case, the print job with the aforementioned file name "document.U-eno.doc" is designated as an example. As shown in FIG. 22, in this file information display screen 244, there is provided a file information display field 244a, a "Back" button 244b, and a "Pay and Proceed to Print" button 244c.

In the file information display field 244a, the file name "document.U-eno.doc," the number of pages in the file of the print job, and the fee charged for executing the print job are displayed as file information. The fee is transmitted by the data processing server 100 so that the information on the amount calculated in S543 is included in the job, for example, and is obtained by the MFP 200.

When the user operates the "PAY AND PROCEED TO PRINT" button 244c, the operation is the final print execution instruction from the user to the MFP 200 (S574). As a result of the operation, a print request corresponding to the print execution instruction is transmitted (S575) from the MFP 200, together with the designation information representing the result of the designation of one of the above print jobs and the machine ID, and is received by the data processing server 100.

Thereafter, the process moves to FIG. 23, and in response to the printing request of S575, the data processing server 100 recalculates, in S576, the amount of the payment fee charged to the user for this printing service, i.e., printing of the one print job designated above, based on the result of the designation of the one print job received in S575. Also in this case, the fee is calculated, for example, based on a particular fee table as described above. The process performed in S576 is also an example of the fifth fee determining process, and the process performed in S576 by the processor 110 of the data processing server 100 is also an example of the fee determining process in the present embodiment.

Thereafter, in S578, the fee calculated in S576 and the product ID issued in S544 for the designated print job are registered in the data processing server 100 in an associated manner (S578).

Next, in S579, the data processing server 100 performs a payment reservation process. Concretely, the product ID associated with a designated print job, the user's payment amount that is the result of the calculation in S576, authentication information to be used for authentication at the transaction server 400, and the URL for confirming the completion of payment (in the present embodiment, the URL of the data processing server 100), are sent to the transaction server 400. Further, the Payment URL for the user to access to pay the fee and the transaction ID related to the fee payment procedure, which are transmitted from the transaction server 400 in response to the above transmissions, are received by the data processing server 100.

Thereafter, in the data processing server 100, the payment amount, which is the result of the calculation in S576, and the transaction ID and the Payment URL obtained in S579 are associated with the JOB ID described above (S581). Then, in accordance with a known and appropriate method, a barcode corresponding to the Payment URL, e.g., a QR code, is generated (S583), and the data necessary for payment, including the QR code, is transmitted to the MFP 200 having the corresponding machine ID described above (S585).

The data required for payment includes the QR code, the above Payment URL and the JOB ID, which are received by the MFP 200 (S587). In the MFP 200 that receives the above data, a particular payment screen displaying the data necessary for the above payment, including at least the aforementioned QR code, is displayed on the display 240 (S589).

An example of the payment screen is shown in FIG. 24. The payment screen 249 shown in FIG. 24 displays the QR code QC, a message M7 that reads "Please access the following URL to make payment." and a URL display field 249a that displays a URL indicating the access destination.

Then, the process moves to FIG. 25, and the user reads the QR code QC displayed on the payment screen 249 with a scanner or a camera provided to the mobile terminal 300 (S591). In this way, a screen displaying the Payment URL (not shown) is displayed on the mobile terminal 300. By accessing the Payment URL displayed on the Payment URL display screen, the fee display screen including the calculated fees, and the like are displayed, and the user can know the fees to be paid for the use of the printing service this time.

Thereafter, the user who sees the fee performs an appropriate operation on the fee display screen displayed on the mobile terminal 300. As a result, the mobile terminal 300 notifies the transaction server 400 (S605) of a payment approval notification indicating that the payment process is approved, or in other words, that the user accepts the payment of the fee.

Next, the transaction server 400, which received the above notification of approval, transmits the Confirm URL corresponding to the Payment URL at the time of the payment reservation (S579) to the mobile terminal 300 (S607). Then, based on this Confirm URL, the mobile terminal 300 transmits a payment completion request, which is received by the data processing server 100 (S609). In this way, the data processing server 100 makes a Yes decision in S611, and the payment completion confirmation process is performed (S613). In other words, the aforementioned authentication information, product ID, and transaction ID corresponding to the Confirm URL are transmitted to the transaction server 400. Further, a return code transmitted, in response, from the transaction server 400 is received by the data processing server 100. After the payment completion confirmation process, the data processing server 100 transmits the payment completion notification (S615), which is received by the MFP 200 (S617).

Thereafter, the data processing server 100 performs a particular conversion on the image data contained in one of the print jobs received in S535, which is designated in the job designation information in S575 and for which the fee has been paid as described above, and then print data is generated (S620), reflecting the latest print settings received in S505. If the print settings have been changed at least once as described above, the print data is generated at S620 so that the print data reflects the latest print setting values after the change. The processor 110 of the data processing server 100 that executes S620 is an example of the fourth data generator. After the print data is generated in this way, the print job will include the aforementioned print command and the print data.

Thereafter, one print job containing the generated print data is transmitted from the data processing server 100 (S625), which is received by the MFP 200 (S626). In this case, the print data may be the print file data itself, or it may be rasterized data for printing. The process performed in S625 above is an example of the second print job transmitting process, and the process performed in S626 is an example of the second print job receiving process. Further, the process performed in S626 by the processor 210 of the MFP 200 is an example of the data obtaining process according to the present embodiment.

Then, in the MFP 200, the print engine (290) executes the print job received in S626 and starts printing on the paper (S627). The process executed in S627 is an example of the printing process.

When the MFP 200 makes a Yes determination in S777 as execution of the printing is completed, a print completion notification is transmitted with the JOB ID in S779. In response, in the data processing server 100, after the transmitted print completion notification and the JOB ID are received (S781), the print job corresponding to the received JOB ID and held in the data storage area 125 is deleted (S783). Thereafter, this sequence flow is terminated.

Effects of Present Embodiment

As described above, in the printing system 1 according to the present embodiment, a print job is obtained by the MFP 200 in S626, and an image corresponding to the print data of the print job is formed on the paper by the print engine 290. The fee charged for forming an image on the paper is determined by the data processing server 100 in S543 and S576. The print engine 290 forms the image on the paper based on the aforementioned print setting values, which can be changed by the respective procedures S501-S505, as described above with reference to FIG. 19. When the print setting values are changed, the print engine 290 forms an image on the paper based on the changed print setting values (S627). As described above, according to the present embodiment, the print setting values can be changed by repeating each of the steps from S501 to S505, so that a predetermined print setting, for example, the print settings based on the input at S501, which is performed first, can then be changed to the desired setting by the user.

In the present embodiment, in particular, the print setting values can be changed for each print file in each of the procedures S501-S505. In this way, for example, unlike the case where the print settings for all the image formation on the MFP 200 are changed all at once, each user's intentions and preferences can be individually reflected in the printed material.

In the present embodiment, in particular, when the print setting values are changed in each of the procedures from S501 to S505, the print data reflecting the changes are generated by the data processing server 100 in S620. Concretely, when the print setting values are changed and the corresponding fees are determined in S543 and S576, the print data is generated in S620. By generating the print data after the change in charge associated with the change in the print setting values, it is possible to clarify the association between the print data after the change in the print setting values and the charge to be charged after that change in the print setting.

In the present embodiment, in particular, each time when the print setting values are changed in each of the procedures from S501 to S505, the fee corresponding to the change is determined in S543. In this way, the fee can be determined in real time in response to changes in the print setting values, and the amount to be charged at the current setting value can be clearly indicated to the user.

In the printing system 1 according to the present embodiment, in particular, when the print setting values related to the print settings of a print job are transmitted from the PC terminal 500 prior to transmission of the print job (S501), the print setting values are obtained by the MFP 200 (S503) and then transmitted to the data processing server (S504). In the data processing server 100, the fee to be charged in response to the print setting values received in S505 is determined in S543, and the fee is transmitted to MFP 200 (S506). The processes S503, S504, S543, and S506 are repeated until a particular completion operation is performed on the PC terminal 500, which is, in the aforementioned example, a "setup complete" operation. In this way, when the user changes, or enters new print setting values via the PC terminal 500, the print setting values for the print job on the data processing server 100 are changed correspondingly. Thereafter, when the above completion operation is performed on the PC terminal 500 and the print job is transmitted (S523), the print job is obtained by the MFP 200 in S524 and then transmitted to the data processing server 100 to be received thereby (S535). The received print job is stored in the data processing server 100 in S542. After that, when the user accepts the fee determined in S543 and S576 and the payment approval is transmitted from the PC terminal 500 (S605), the print job stored in the data processing server 100 is read out and transmitted to the MFP 200 (S625). After the transmitted print job is received by the MFP 200 in S626, the image is formed by the print engine 290 in S777. As described above, according to the present embodiment, the user can change the print settings that have been decided in advance to the print settings as desired afterwards, and the print job can be executed and the corresponding image can be formed according to the changed print settings.

Modifications

This second embodiment is not limited to the above-mentioned configuration, and various modifications are possible within the scope of not departing from its object and technical concept. Such modifications will be described sequentially below. Parts equivalent to those in the first and second embodiments above are assigned with the same symbols, and descriptions are omitted or simplified as appropriate.

(2-1) When PC Terminal Obtains Fee Table and Calculates Fees

A main part of a control procedure in this modification, which represents a process executed by the processor 210 of the MFP 200, the processor 110 of the data processing server 100, the processor of the transaction server 400, and the processor of the mobile terminal 300, is described with reference to FIG. 26, which corresponds to FIG. 19 described above.

In S600, the user appropriately operates the operation panel of the PC terminal 500 to check whether the MFP 200 is in a contract business mode in which a contract for the printing service has been concluded on the PC terminal 500 side (S600). Thereafter, authentication is performed as particular authentication information is transmitted from the MFP 200 to the data processing server 100, and then a connection between the MFP 200 and the data processing server 100 is confirmed (S601). By this authentication, it is guaranteed that the fee table transmitted from the data processing server 100 through the MFP 200 to the PC terminal 500 is authentic as described later, and a substitution by a malicious third party can be avoided.

Thereafter, a transmission request for the fee table is transmitted by the MFP 200 (S602), and is received by the data processing server 100 (S603). In response, the data processing server 100 reads the fee table stored in the fee table storage area 132 and transmits the fee table to the MFP 200 (S604). The process performed in S604 is an example of a first determination information transmitting process. After the fee table is received by the MFP (MFP) 200 (S605), the fee table is further transmitted to the PC terminal 500 (S606). The process executed in S605 is an example of a first determination information obtaining process, and the process executed in S606 is an example of a second determination information transmitting process. The PC terminal 500 obtains the fee table (S607). The process performed in S607 is an example of a second determination information obtaining process.

Thereafter, as in FIG. 19 of the second embodiment, when the user enters print settings by operating the above operation panel of the PC terminal 500 as appropriate (S501), the settings are received by the PC terminal 500 (S502). The process executed in S502 is an example of a print setting receiving process. Then, in S643, the PC terminal 500 calculates the fee to be charged to the user for printing the image data included in the print job received in S502 based on the print setting contents, i.e., each print setting value for the print job. At that time, the fee is calculated based on the fee table already obtained in S607. The process performed in S643 is an example of a sixth fee determining process, and the process performed in S643 by the processor of PC terminal 500 is an example of a fee determining process according to the present embodiment. Thereafter, the PC terminal 500 displays the fees for executing the printing of the print job on the display device based on the results of the calculation in S643 (S509).

If the user who has seen the fee display on the display device confirms the fee and decides that he/she can proceed to printing with the print settings at that point, the user performs an operation to input "setting completion" (S510: Yes), as in the second embodiment described above. In such a case, as in the second embodiment above, the process moves to S521 onward in FIG. 20. The operation input of "setting completion" is an example of a particular completion operation in the present modification as well. If the user decides to perform the print setting again instead of proceeding to print with the print settings at that point (S510: No), S502, S643, and S509 are repeated by inputting the print settings in S501 described above again without inputting the above "setting completion" operation. In this way, the print settings can be redone as many times as necessary until the user enters the "setting completion" input. In that sense, in this modification, the process performed in S502 by the processor of the PC terminal 500 is an example of a setting value changing process according to the present embodiment.

The subsequent processes are similar to those in FIG. 20, FIG. 23, and FIG. 25 in the second embodiment above, and a detailed description thereof is omitted. It is noted that the process performed in S576 of FIG. 23 is also an example of the sixth fee determining process.

Effects of Modification

In the modification configured as above, effects similar to those of the second embodiment can be obtained. Further, according to the present modification, in particular, the following effects can be obtained. In the printing system 1 according to the present modification, prior to transmission of a print job, the fee table is transmitted from the data processing server 100 to the MFP 200 (S604), then to the PC terminal 500 via S605 and S606, and is obtained at S607. When the print setting values pertaining to the print settings for that print job are received by the PC terminal 500 (S501), the fee to be charged corresponding to the received print setting values above is determined in S643. In the PC terminal 500, S502 and S643 are repeated until a particular completion operation is performed, in the aforementioned example, the "setting completion" operation. As a result, when the user changes, or newly inputs, print setting values via the PC terminal 500, the print setting values of the print job are correspondingly changed and the corresponding fees are determined. Thereafter, when the above completion operation is performed in the PC terminal 500 and the print job is transmitted (S523 in FIG. 20), the print job is obtained by the MFP 200 in S524 and then transmitted to the data processing server 100 (S533), and received in the receiving process (S535). The received print job is stored in the data processing server 100 (S542). Thereafter, when the user approves the fees determined in S643 and S576 and the payment authorization is transmitted from the PC terminal 500 (S605), the print job stored in the data processing server 100 is read and transmitted to the MFP 200 (S625). The transmitted print job is received by the MFP 200 in S626, and then the image is formed by the print engine 209 in S777. s described above, in the present modification, as in the second embodiment, the user can change the print settings determined in advance as desired, and execute a print job to form the corresponding image according to the changed print settings.

(2-2) When Fee is Calculated After "Setting Completed" is Input

The main part of the control procedure according to the present modification, which procedure represents a process performed by the processor 210 of the MFP 200, the processor 110 of the data processing server 100, the processor of the transaction server 400, and the processor of the mobile terminal 300, is described with reference to FIG. 27 which corresponds to FIG. 19.

In FIG. 27, in this modification, S501 to S505 similar to those in FIG. 19 are first executed. That is, when the user enters print setting values, the received print setting contents are transmitted from the PC terminal 500 to the data processing server 100 via the MFP 200. Also in this modification, the process performed in S504 is an example of the print setting value transmitting process, and the process performed in S505 is an example of the print setting value receiving process.

Thereafter, if the user determines to proceed to print with the print settings as they are, the user operates the operation panel of the PC terminal 500 appropriately to input "setting completed" (S510: Yes and S701). With this, a notification indicating that an operation input has been made to indicate that the setting has been completed is transmitted from the PC terminal 500 to the data processing server 100 (S702). This notification may be transmitted from the PC terminal 500 to the MFP 200 and then from the MFP 200 to the data processing server 100. Since this notification is an instruction to execute the fee calculation in S543 described below, the process performed in S702 by the processor of the PC terminal 500 is an example of an instruction input process according to the present application.

In the data processing server 100 that receives the notification, as described above with reference to FIG. 19, based on each print setting stored in the print setting storage area 124, the fee for printing the print job is calculated, in S543, using the fee table described above, which is stored in the fee table storage area 132. Also in this modification, the process performed in this S543 is an example of the fifth fee determining process, and the process performed in S543 by the processor 110 of the data processing server 100 is an example of the fee determining process according to the present application.

Thereafter, as in FIG. 19, the result of the fee calculation in S543 is transmitted from the data processing server 100 (S506) and received by the PC terminal 500 (S508) through S507 and S508 in the MFP 200. Also in this modification, the process performed in S506 is an example of a fee transmitting process. Based on the received results, the PC terminal 500 displays the fees for executing the printing of the above print job (S509). After the fee is displayed, the process moves to S521 in FIG. 20. The subsequent processes are the same as those in the second embodiment, and are omitted from the description.

On the other hand, if the user determines to perform the print settings again instead of proceeding to print with the print settings at the time when S505 is executed, S502 to S505 are repeated by inputting the print settings in S501 again, without performing the operation to input "setting completed" as described above (S510: No). In this way, the print settings can be redone as many times as necessary until the user performs the "setting completion" operation input.

Effects of Modification

The same effect as in the second embodiment above is obtained in the present modification. In the present modification, in particular, if the print setting values are changed in S502 as described above, and if an instruction input for fee calculation is also made in S701, in the aforementioned example, "setting completed" is input, the fee corresponding to the change is calculated in S543. In this way, it is possible to avoid the unnecessary execution of the fee calculation process at a stage before the change in print setting values has been established.

(2-3) When Fee is Calculated After Generation of Print Data

In this modification, the main parts of the control procedure representing the processes executed by the processor 210 of the MFP 200, the processor 110 of the data processing server 100, the processor of the transaction server 400, and the processor of the mobile terminal 300 are described with reference to FIG. 28, which corresponds to FIG. 27, and FIG. 29, which corresponds to FIG. 25.

As shown in FIG. 28, in this modification, S501-S702, similar to those in FIG. 27, are first performed. That is, when the user enters print setting values, received print setting contents are transmitted from the PC terminal 500 to the data processing server 100 via the MFP 200. In this modification, the process performed in S504 is an example of a print setting value transmitting process, and the process performed in S505 is an example of a print setting value receiving process.

Thereafter, when the user performs an operation to input the "setting completed" (S510: Yes and S701), the corresponding notification is transmitted from the PC terminal 500 to the data processing server 100 (S702).

In the present modification, after S702, the same process as each of the steps described with reference to FIG. 20 and FIG. 25 in the second embodiment is performed. However, since the fee charged for printing a print job has not been calculated, the fee is not registered in S545 of FIG. 20, and the fee is not displayed on the file information display screen 244 shown in FIG. 22. Then, in S576 of FIG. 23, the above fee is calculated for the first time for the print job in question. In this modification, the process performed in S576 is an example of the fifth fee determining process.

In this modification, after each of the steps shown in FIG. 23 is completed, the process moves to FIG. 29, which corresponds to FIG. 25. In FIG. 29, S620 similar to that in FIG. 25 is executed in data processing server 100 after execution of S591 to S615 similar to those in FIG. 25. That is, in the data processing server 100, among the print jobs received in S535, the image data in one print job designated in the job designation information in S575 and paid for as described above is subjected to a particular conversion, and then the print data is generated in a form reflecting the latest print settings received in S505 of FIG. 28. If the print settings have been changed at least once as described above, the print data is generated in S620 to reflect the latest print setting values after the change. In this modification, the process performed in S620 by the processor 110 of the data processing server 100 is an example of the data generating process according to the present application.

After S620, in data processing server 100, based on each print setting value received in S505, the fee for printing the image data included in the print job is calculated based on the fee table (S843), as is done in S543. In this modification, the process performed in S843 is an example of the fifth fee determining process, and the process performed in S543 by the processor 110 of the data processing server 100 is an example of the fee determining process according to the present application.

In the present modification, after S843, processes S806, S807, S808, and S809 are executed, which are similar to S506, S507, S508, and S509 in FIG. 19. That is, the result of the fee calculation in S843 is transmitted from the data processing server 100 (S806) and obtained by the MFP 200 (S807). The process performed in S806 is an example of the fee transmitting process in this modification. The obtained fee calculation results are further transmitted from the MFP 200 and received by the PC terminal 500 (S808). Based on the received results, the PC terminal 500 displays the fees for performing the printing of the printing job on the display device (S809). S625 to S783 executed thereafter are the same as those in FIG. 25 and description thereof are omitted.

Effects of Modification

The same effect as in the second embodiment is obtained in the present embodiment. Further, in the present modification, in particular, when the print setting values are changed in S502 of FIG. 28 as described above and the print data is generated in S620 of FIG. 29 reflecting such a change, the fee corresponding to such change is determined by the data processing server 100 in S843. In this way, it is possible to clarify the correspondence between the print data after the change in print setting values and the fees charged after that change in the print settings.

Other Modifications Common to All Embodiments

In the above, it is explained that the fees for printing are calculated by "calculation" using the fee table as an example, but the method for determining the fees is not limited to this. That is, in another fee table separate from the aforementioned fee table, a fee amount may be individually associated with each of multiple ranges of print setting values, such as, for example, the number of pages of paper to be printed, and basic information such as the number of copies, the paper size, the print color, and the paper type, as well as extended information including image data duty ratio, print coverage, and the like as described above. The table may then be referred to and the fee may be determined without any particular calculation. For example, in the example of the number of pages, in one table, for example, "xx yen if the number of printed pages is from 0 to xx pages," "xx yen if the number of printed pages is from xx to yy pages," and the like. Once the number of pages in the print data of the print file is obtained, the fee can be determined directly by referring to the table, without the need for calculation as described above.

The above is described in accordance with an example according to aspects of the present disclosures is applied to the MFP 200 that is configured to perform printing using an inkjet method, but is not necessarily limited to this. That is, the present disclosures can be applied when the MFP 200 prints using the laser method, and the same effect as described above is achieved. Furthermore, the configuration is not limited to one employing the inkjet or laser system, but can also be applied to the MFP 200 configured to perform printing using other known methods, such as thermal transfer.

In the above, the sequence flows shown in FIG. 2, FIG. 5, FIG. 8, FIG. 10, FIG. 12, FIG. 13, FIG. 16, FIG. 19, FIG. 20, FIG. 23, FIG. 25, FIG. 26, FIG. 27, FIG. 28, and FIG. 29 are not limited to the procedures shown therein, but additions, deletions, or changes in the order of the steps may be made to the extent that they do not depart from the purpose and technical concept of the aspects of the present disclosures.

In addition to what has already been described above, the methods of the first embodiment, the second embodiment, and each of the modifications described above may be used in combination as appropriate.

Although other examples will not be given, the present disclosures may be implemented with various modifications within the scope of not departing from the intent of aspects of the present disclosures.

What is claimed is:

1. A printing system comprising:
a print engine; and
one or more controllers configured to:
obtain print data;
control the print engine to print an image corresponding to the print data on a printing medium based on a print setting value;
a determine a fee to be charged when printing the image corresponding to the print data on the printing medium;
output an address of a payment page to pay the determined fee; and
change the print setting value.

2. The printing system according to claim 1, wherein the one or more controllers are configured to:
obtain a print file containing the print data; and
change the print setting value for each obtained print file.

3. The printing system according to claim 1, wherein the one or more controllers are further configured to receive:
payment approval of the fee; and
generate the print data reflecting a change of the print setting value when the print setting value is changed, determine the fee for the change of the print setting value, and receive the payment approval of the fee for the change of the print setting value.

4. The printing system according to claim 1, wherein the one or more controllers are further configured to:
generate the print data before the print setting value is changed, and then generate the print data reflecting the change of the print setting value each time the print setting value is changed.

5. The printing system according to claim 1, wherein the one or more controllers are further configured to generate the print data reflecting the change of the print setting value when the print setting value is changed and determine the fee for the change of the print setting value.

6. The printing system according to claim 1,
wherein the one or more controllers are configured to determine a fee for the change of the print setting value each time the print setting value is changed.

7. The printing system according to claim 1, wherein the one or more controllers are further configured to receive an instruction input to determine the fee, and determine a fee for the changed print setting value when the print setting value is changed and the instruction input is received.

8. The printing system according to claim 1, wherein the one or more controllers are further configured to, when the print setting value is changed, generate the print data reflecting the change of the print setting value, and determine a fee for the change of the print setting value when the print data reflecting the change of the print setting value is generated.

9. The printing system according to claim 1, further comprising:
a printing device including:
the print engine; and
a first controller; and
a data processing server including:
a communication interface configured to communicate with the printing device; and
a second controller,
wherein the one or more controllers include the first controller and the second controller,
wherein the second controller is configured to:
receive, from an external device, a first email to which a print file is attached and which is addressed to a printing device e-mail address assigned to the printing device, the first email including a print setting value to which print setting of the print file is set by a user accessing a first URL of a print setting page;
determine a fee charged when an image is printed on the printing medium based on the print file attached to the first email;
generate a second email reciting a first amount of the fee, a second URL, being the address, of the payment page used to pay the first amount, and a third URL of a print setting changing page configured to change the print setting value of the print file;
transmit the second email to the external device as reply to the first email;
change, based on the print setting value changed by the user accessing the third URL, the print setting value corresponding to print data based on the print file attached to the first email;
determine a second amount reflecting the change of the print setting value; and
transmit at least one of print data based on the print file or storage destination information of the print data to the printing device through the communication interface after payment of the second amount is carried out by the user accessing the second URL recited in the second email, and
wherein the first controller is configured to:
obtain the print data transmitted by the second controller or the print data from a storage destination accessible by using the storage destination information transmitted by the second controller; and
print the image corresponding to the obtained print data on the printing medium by using the print engine based on the changed print setting value.

10. The printing system according to claim 1, further comprising:
a printing device including:
the print engine; and
a first controller; and
a data processing server including:
a communication interface configured to communicate with the printing device; and
a second controller,
wherein the one or more controllers include the first controller and the second controller,
wherein the second controller is configured to:
receive, from an external device, a first email to which a print file is attached and which is addressed to a printing device e-mail address assigned to the printing device, the first email including a print setting value to which print setting of the print file is set by a user accessing a first URL of a print setting page;
determine a fee charged when an image is printed on the printing medium based on the print file attached to the first email;
generate a second email reciting a first amount of the fee, and a second URL, being the address of the payment page used to pay the first amount; and
transmit the second email to the external device as reply to the first email,
wherein the first controller is configured to:
change, based on the print setting value changed by input to a web page accessible by a particular URL, the print setting value corresponding to print data based on the print file attached to the first email,
wherein the second controller is further configured to:
determine a second amount reflecting the change of the print setting value; and
transmit at least one of print data based on the print file or storage destination information of the print data to the printing device through the communication interface after payment of the second amount is carried out by the user accessing the second URL recited in the second email, and
wherein the first controller is further configured to:
obtain the print data transmitted by the second controller or the print data from a storage destination accessible by using the storage destination information transmitted by the second controller; and
print the image corresponding to the obtained print data on the printing medium by using the print engine based on the changed print setting value.

11. The printing system according to claim 1, further comprising:
a printing device including:
the print engine;
a first controller; and
an operation panel; and
a data processing server including:
a communication interface configured to communicate with the printing device; and
a second controller,
wherein the one or more controllers include the first controller and the second controller,
wherein the second controller is configured to:
receive, from an external device, a first email to which a print file is attached and which is addressed to a printing device e-mail address assigned to the printing device, the first email including a print setting value to which print setting of the print file is set by a user accessing a first URL of a print setting page;
determine a fee charged when an image is printed on the printing medium based on the print file attached to the first email;
generate a second email reciting a first amount of the fee, and a second URL, being the address of the payment page used to pay the first amount; and
transmit the second email to the external device as reply to the first email,
wherein the first controller is configured to:
change, based on the print setting value changed by input to the operation panel, the print setting value corresponding to print data based on the print file attached to the first email,
wherein the second controller is further configured to:
determine a second amount reflecting the change of the print setting value; and
transmit at least one of print data based on the print file or storage destination information of the print data to the printing device through the communication interface after payment of the second amount is carried out by the user accessing the second URL recited in the second email, and wherein the first controller is further configured to:
obtain the print data transmitted by the second controller or the print data from a storage destination accessible by using the storage destination information transmitted by the second controller; and
print the image corresponding to the obtained print data on the printing medium by using the print engine based on the changed print setting value.

12. A printing system comprising:
a print engine; and
one or more controllers configured to:
obtain print data;
control the print engine to print an image corresponding to the print data on a printing medium based on a print setting value;
determine a fee to be charged when printing the image corresponding to the print data on the printing medium; and
change the print setting value,
wherein the print setting value includes a first print setting value and a second print setting value, the first print setting value requiring a first time to generate print data, the second print setting value requiring a second time to generate print data, the second time being shorter than the first time,
wherein the one or more controllers are further configured to:
receive a change to only the second print setting value among the first print setting value and the second print setting value; and
generate the print data before the print setting value is changed, and then generate the print data reflecting the change of the second print setting value each time the second print setting value is changed.

13. A printing system comprising:
a print engine; and
one or more controllers configured to:
obtain print data;
control the print engine to print an image corresponding to the print data on a printing medium based on a print setting value;
determine a fee to be charged when printing the image corresponding to the print data on the printing medium; and
change the print setting value, the print system further comprising:
a printing device including:
the print engine;
an operation panel; and
a first controller; and
a data processing server including:
a server memory; and
a second controller,
wherein the one or more controllers include the first controller and the second controller,
wherein the first controller is configured to:
obtain, from an external device, a print setting value to which print setting of a print job transmitted from the external device is related; and
transmit the obtained print setting value,
wherein the second controller is configured to:
receive the print setting value transmitted by the first controller;
determine a fee charged for the received print setting value; and
transmit the determined fee,
wherein the first controller and the second controller are configured to repeatedly at least obtain the print setting value and transmit the obtained print setting value until a particular completion operation is performed in the external device,
wherein, when the particular completion operation is performed in the external device:
the first controller is configured to:
obtain the print job transmitted from the external device; and
transmit the obtained print job to the data processing server; and
the second controller is configured to:
receive the print job transmitted by the first controller;
store the print job received by the second controller in the server memory; and
transmit the print job stored in the server memory to the printing device in response to transmitting payment approval of the fee, and
wherein the first controller is further configured to:
receive the print job transmitted by the second controller; and
control the print engine to print an image based on the print job received by the first controller .

14. A printing system comprising:
a print engine; and
one or more controllers configured to:
obtain print data;
control the print engine to print an image corresponding to the print data on a printing medium based on a print setting value;
determine a fee to be charged when printing the image corresponding to the print data on the printing medium; and
change the print setting value, the printing system further comprising:
a printing device including:
the print engine;
an operation panel; and
a first controller;
a data processing server including:
a server memory; and
a second controller; and
an external device,
wherein the one or more controllers include the first controller and the second controller,
wherein the second controller is configured to:
transmit fee determination information,
wherein the first controller is configured to:
obtain the fee determination information transmitted by the second controller; and
transmit the fee determination information to the external device,
wherein the external device is configured to:
obtain the fee determination information transmitted by the first controller;
receive a print setting value related to a print job to be transmitted to the printing device; and
determine a fee charged for the print setting value received using the fee determination information obtained from the first controller, wherein the external device is configured to repeatedly receive the print setting and determine the fee until a particular completion operation is performed in the external device, wherein, when the particular completion operation is performed in the external device:

the first controller is configured to:
  obtain the print job transmitted from the external device; and
  transmit the print job obtained from the external device to the data processing server; and the second controller is configured to:
  receive the print job transmitted by the first controller;
  store the print job received by the second controller in the server memory; and
  transmit the print job stored in the server memory to the printing device in response to transmitting payment approval of the fee, and wherein the first controller is further configured to:
  receive the print job transmitted by the second controller; and
  control the print engine to print an image based on the print job received by the first controller.

\* \* \* \* \*